(12) United States Patent
Kinlen et al.

(10) Patent No.: US 9,771,483 B2
(45) Date of Patent: Sep. 26, 2017

(54) SYSTEMS, COMPOSITIONS, AND METHODS FOR CORROSION INHIBITION

(71) Applicant: The Boeing Company, Seal Beach, CA (US)

(72) Inventors: Patrick John Kinlen, Renton, WA (US); Erik David Sapper, Everett, WA (US)

(73) Assignee: The Boeing Company, Chicago, IL (US)

( * ) Notice: Subject to any disclaimer, the term of this patent is extended or adjusted under 35 U.S.C. 154(b) by 864 days.

(21) Appl. No.: 13/866,805

(22) Filed: Apr. 19, 2013

(65) Prior Publication Data

US 2014/0315004 A1    Oct. 23, 2014

(51) Int. Cl.
  *C09D 5/08* (2006.01)
  *C09D 7/12* (2006.01)
  *C08K 5/372* (2006.01)

(52) U.S. Cl.
  CPC .......... *C09D 5/086* (2013.01); *C09D 7/1233* (2013.01); *C08K 5/372* (2013.01); *Y10T 428/24942* (2015.01); *Y10T 428/31533* (2015.04)

(58) Field of Classification Search
  CPC ..... C09D 7/1241; C08K 5/3725; C08K 5/372
  See application file for complete search history.

(56) References Cited

U.S. PATENT DOCUMENTS

| | | | | |
|---|---|---|---|---|
| 3,268,347 A * | 8/1966 | Nagasawa | ............ | C07F 7/2268 106/18.32 |
| 4,107,059 A | 8/1978 | King et al. | | |
| 4,259,344 A * | 3/1981 | Gonczi | ................ | C07D 233/32 514/388 |
| 4,405,732 A | 9/1983 | Chao et al. | | |
| 4,599,425 A | 7/1986 | Hugo et al. | | |
| 5,006,588 A | 4/1991 | Miller | | |
| 5,247,061 A | 9/1993 | Zisman et al. | | |
| 5,776,587 A | 7/1998 | Angelopoulos et al. | | |
| 6,187,227 B1 * | 2/2001 | Minevski | ........... | B01D 53/1493 208/207 |
| 6,440,332 B1 | 8/2002 | Geer et al. | | |
| 6,620,338 B2 * | 9/2003 | Fan | ........................... | C02F 1/50 252/180 |
| 7,662,241 B2 | 2/2010 | Sinko | | |
| 8,114,206 B2 | 2/2012 | Hayes et al. | | |
| 8,691,028 B2 | 4/2014 | Kendig et al. | | |

FOREIGN PATENT DOCUMENTS

| | | |
|---|---|---|
| CN | 101443421 | 5/2009 |
| CN | 101914771 | 12/2010 |
| EP | 0482608 A1 | 4/1992 |
| EP | WO 2010/045657 A1 | 4/2010 |

OTHER PUBLICATIONS

Antonijevic et al, "Copper Corrosion Inhibitors. A Review," Int. J. Electrochem. Sci., vol. 3, 1-28 (2008).
Biallozor et al., "Conducting Polymers Electrodeposited on Active Metals," Synthetic Metals, 155, 443-449 (2005).
Block et al., "Simple Total Synthesis of Biologically Active Pentathiadecane Natural Products, 2,4,5,7,9-Pentathiadecane 2,2,9,9-Tetraoxide (Dysoxysulfone), from *Dysoxylum richii*, and 2,3,5,7,9-Pentathiadecane 9,9-Dioxide, the Misidentified Lenthionine Precursor SE-3 from Shitake Mushroom (*Lentinus edodes*)," J. Org. Chem., vol. 59, No. 9, 2273-2275 (1994).
Chen et al., "Identification of Sulfurous Compounds of Shitake Mushroom (*Lentinus edodes* Sing.)," J. Agric. Food Chem., 34, 830-833 (1986).
Cleland, "Dithiothreitol, a New Protective Reagent for SH Groups," Biochemistry, vol. 3, No. 4, 480-482 (1964).
Conroy et al., "The Electrochemical Deposition of Polyaniline at Pure Aluminum: Electrochemical Activity and Corrosion Protection Properties," Electrochimica Acta, 48, 721-732 (2003).
Garrigues et al., "An Investigation of the Corrosion Inhibition of Pure Aluminum in Neutral and Acidic Chloride Solutions," Electrochimica Acta, 41, 1209-1215 (1996).
Grabarnick et al., "A New Class of Chiral Macrocyclic Polythiacrown Systems and a *Caveat*," J. Chem. Soc., Perkin Trans. 1, 3123-3125 (1997).
Harvey et al., "The Effect of Inhibitor Structure on the Corrosion of AA2024 and AA7075," Corrosion Science, 53, 2184-2190 (2011).
Homhual et al., "Bruguiesulfurol, A New Sulfur Compound from *Bruguiera gymnorrhiza*," Planta Med, 72, 255-260 (2006).
Huang et al., "Diastereomeric Macrocyclic Polydisulfides from the Mangrove *Bruguiera gymnorrhiza*," Phytochemistry, 70, 2096-2100 (2009).
Ito et al., "Gas-Liquid Chromatographic Determination of Lenthionine in Shitake Mushroom (*Lentinus edodes*) with Special Reference to the Relation Between Carbon Disulfide and Lenthionine," J. of Food Sci., 43, 1287-1289 (1978).
Jacob, "A Scent of Therapy: Pharmacological Implications of Natural Products Containing Redox-Active Sulfur Atoms," Nat. Prod. Rep., 23, 851-863 (2006).
Kalimuthu et al., "Solvent Induced Disulfide Bond Formation in 2,5-dimercapto-1,3,4-thiadiazole," Nature Proceedings, 1, 734-736 (2007).
Kendig, "Evaluation of 'Smart' Protective Coatings and Surface Treatments for Aluminum," 4th Intl Symposium on Aluminum Surface Science and Technology, (2006).
Kolics et al., "Adsorption of Sulfate and Chloride Ions on Aluminum," Electrochimica Acta, vol. 43, No. 18, 2605-2618 (1998).

(Continued)

*Primary Examiner* — Peter F Godenschwager
(74) *Attorney, Agent, or Firm* — Dascenzo Intellectual Property Law, P.C.

(57) ABSTRACT

Corrosion inhibition systems, including coated substrates, coating materials and corrosion inhibition compounds, and methods of making the same are disclosed. These systems and methods include corrosion inhibition compounds that are responsive to corrosion at a surface, releasing active inhibitor groups upon a corrosion stimulus. The active inhibitor groups are selected to block corrosion at the surface by inhibiting oxidation reactions, reduction reactions and/or by forming a passivation layer.

23 Claims, 2 Drawing Sheets

(56) References Cited

OTHER PUBLICATIONS

Lebrini et al., Experimental and Theoretical Study for Corrosion Inhibition of Mild Steel in Normal Hydrochloric Acid Solution by Some New Macrocyclic Polyether Compounds, Corrosion Science, 49, 2254-2269 (2007).
Lee et al., An Unprecedented Luminescent Polynuclear Gold(I) $\mu_3$-Sulfido Cluster With a Thiacrown-like Architecture, J. Am. Chem. Soc., 132, 17646-17648 (2010).
Matsumoto et al., "Studies on the Adsorption Behavior of 2,5-Dimercapto-1,3,4-thiadiazole and 2-Mercapto-5-methyl-1,3,4-thiadiazole at Gold and Copper Electrode Surfaces," Langmuir, vol. 15, No. 3, 857-865 (1999).
Morita et al., "Isolation and Synthesis of Lenthionine, an Odorous Substance of Shitake, an Edible Mushroom," Tetrahedron Letters, No. 6, 575-577 (1966).
Morita et al., "Isolation, Structure and Synthesis of Lenthionine and Its Analogs," Chem. Pharm. Bull., vol. 15, No. 7, 988-993 (1967).
Papavinasam, "Corrosion Inhibitors," Uhlig's Corrosion Handbook, Third Ed., 71, 1021-1032 (2011).
Pournaghi-Azar et al., "Electropolymerization of Aniline in Acid Media on the Bare and Chemically Pre-Treated Aluminum Electrodes: A Comparative Characterization of the Polyaniline Deposited Electrodes," Electrochimica Acta, 52, 4222-4230 (2007).
Quraishi et al., "Macrocyclic Compounds as Corrosion Inhibitors," Corrosion Science Section, vol. 54, No. 12, 996-1002 (1998).
Sato, "Basics of Corrosion Chemistry," Green Corrosion Chemistry and Engineering: Opportunities and Challenges, First Ed., 1, 1-32 (2012).
Shinkai et al., "Redox-Switched Crown Ethers. 3. Cyclic-Acyclic Interconversion Coupled with Redox between Dithiol and Disulfide and Its Application to Membrane Transport," J. Am. Chem. Soc., 107, 3950-3955 (1985).
Sinko, "Challenges of Chromate Inhibitor Pigments Replacement in Organic Coatings," Progress in Organic Coatings, 42, 267-282 (2001).
Sun et al., "Gymnorrhizol, an Unusual Macrocyclic Polydisulfide from the Chinese Mangrove *Bruguiera gymnorrhiza*," Tetrahedron Letters, 45, 5533-5535 (2004).
Wratten et al., "Cyclic Polysulfides from the Red Alga *Chondria californica*," J. Org. Chem., vol. 41, No. 14, 2465-2467 (1976).
State Intellectual Property Office of the P.R.C., Office action for related Chinese Patent Application No. 201480016496, dated Sep. 1, 2016.
Partial English translation of the State Intellectual Property Office of the P.R.C., Office action for related Chinese Patent Application No. 201480016496, dated Sep. 1, 2016.
State Intellectual Property Office of the P.R.C., Search Report for related Chinese Patent Application No. 201480016496, dated Aug. 26, 2016.
Machine-generated English translation of the abstract for Chinese Patent No. CN 101914771, downloaded from epacenet.com on Sep. 12, 2016.
Australian Government: IP Australia, Examination Report for related Australian Patent Application No. 2017254442, Mar. 1, 2017.
Machine-generated English translation of the abstract for Chinese Patent No. CN 101443421, downloaded from Espacenet.com on Mar. 30, 2017.

* cited by examiner

SYSTEMS, COMPOSITIONS, AND METHODS FOR CORROSION INHIBITION

FIELD

The present disclosure is directed generally to systems, compositions, and methods for corrosion inhibition.

BACKGROUND

Corrosion damage is a costly problem for environmentally exposed materials, especially metals. Estimates put the total cost attributed to corrosion at a few percent of the gross domestic product of industrialized countries. In the aerospace industry alone, losses due to corrosion damage exceed $2 Billion per year. Thus, people have attempted many solutions to prevent or reduce the effects of corrosion.

Chemically, metallic corrosion may be described as a coupled electrochemical reaction consisting of anodic metal oxidation and cathodic oxidant reduction. Metallic materials corrode in a variety of gaseous and/or aqueous environments, such as wet air in the atmosphere. Generally, metallic corrosion in its initial stage produces soluble metal ions in water, and then, the metal ions develop into solid corrosion precipitates such as metal oxides and hydroxides.

Corrosion protection may take a variety of forms, such as the introduction of certain elements into corrodible base metal, creating a corrosion-resistant alloy, and/or the addition of a surface coating, such as a chemical conversion coating, a metal plating or a paint. While in use, additional moisture barriers, such as viscous lubricants and/or protectants, may be added to the corrodible surface. Conventional surface coatings for metals may use hexavalent chromium as the active corrosion-inhibiting ingredient. Though effective, environmentally preferred alternatives to hexavalent chromium are being sought. However, hexavalent chromium alternatives typically suffer from several limitations including low corrosion suppression efficacy, poor compatibility with common coating materials, and high cost. Thus there exists a need for improved, and/or more environmentally friendly systems, compositions, and methods for corrosion inhibition.

SUMMARY

Corrosion inhibition systems, including coated substrates, coating materials and corrosion inhibition compounds, and methods of making the same are disclosed. These systems and methods include corrosion inhibition compounds that are responsive to corrosion at a surface, releasing active inhibitor groups upon occurrence of a corrosion precursor event. Corrosion inhibition compounds include at least two inhibitor groups linked to the corrosion inhibition compound via labile linkages. The labile linkages are selected such that a corrosion stimulus, such as a local electric field, a pH change, a redox potential, and/or a corrosion potential, is sufficient to separate the labile linkage and release a dissociated inhibitor group. Corrosion inhibition compounds may be a polymer and/or a macrocyclic polysulfide.

In some embodiments, corrosion inhibition coating materials may be created by selecting a corrosion inhibition compound, selecting a carrier adapted to coat a substrate, and mixing the two. Carriers adapted to coat substrates commonly are reactive in an uncured state, and specifically reactive to thiol, thione, amino and/or amido groups. Dissociated inhibitor groups released from corrosion inhibition compounds may include reactive thiol, thione, amino and/or amido groups. Further the labile linkages often include sulfide and/or metal-sulfide bonds. However, the corrosion inhibition compounds disclosed herein generally do not react with carriers. Thus, mixing corrosion inhibition compounds with carriers, even reactive carriers, results in a functional corrosion inhibition coating material, suitable to protect corrodible substrates.

In some embodiments, corrosion inhibition compounds may be selected to specifically adhere to and/or have a specific affinity for certain substrates. In particular, macrocyclic corrosion inhibition compounds generally may be designed and/or selected for specific affinity for metal and/or metal alloy surfaces. Thus, when employed on a coated substrate, corrosion inhibition compounds with a specific affinity for the substrate generally will be in proximity of the substrate.

DESCRIPTION

Corrosion inhibition systems of this disclosure generally form a passive coating on a substrate, such as a metal. However, when a corrosion precursor event changes the local environment (a corrosion stimulus), the corrosion inhibition systems release corrosion inhibitor groups which are active. Corrosion inhibition systems comprise corrosion inhibition compounds that include at least two corrosion inhibitor moieties, which also may be referred to herein as corrosion inhibitor groups and/or corrosion inhibition functionalities. Corrosion inhibition systems may include polymers and/or macrocycles incorporating corrosion inhibitor groups. Generally, the corrosion inhibition systems are hexavalent chromium free.

Corrosion typically results from a local galvanic couple between an anode site and a cathode site on a substrate. When the local potential between the anode site and the cathode site is sufficiently large, corrosion products may form at the anode site and/or the cathode site. Corrosion inhibition systems stop corrosion by releasing corrosion inhibitor groups instead of allowing corrosion products to form. The released corrosion inhibitor groups, also referred to as dissociated inhibitor groups, generally diffuse to the corroding site and "turn off" or "tune down" the cathodic and/or anodic corrosion reaction. The local galvanic action then stops, shutting down release of additional corrosion inhibitor groups from the corrosion inhibition compound. Thus, pinhole and/or scratch protection may be achieved with corrosion inhibition systems according to the present disclosure, as well as protection around undamaged galvanic couplings, e.g., metal structures fitted with dissimilar metal fasteners.

Figure 1:
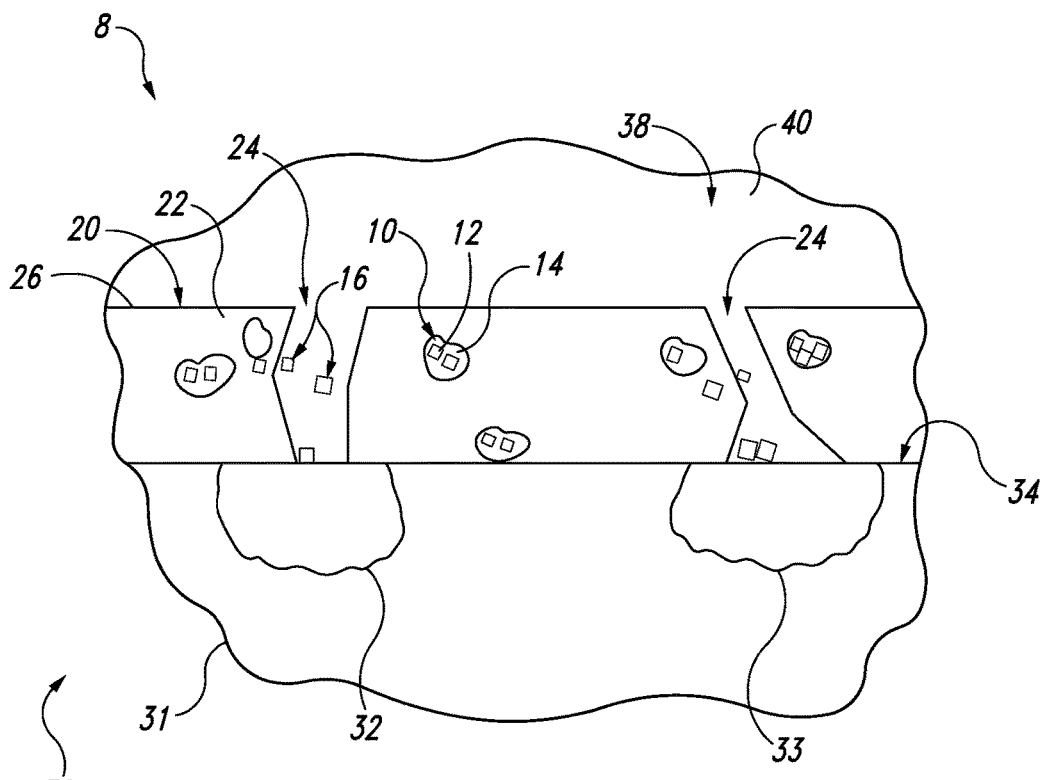
FIG. 1 is a schematic diagram of illustrative, non-exclusive examples of corrosion inhibition systems on a substrate according to the present disclosure.

FIG. 1 schematically represents illustrative, non-exclusive examples of coated substrates 30, corrosion inhibition coating materials 20 and/or corrosion inhibition compounds 10 that may be included in, form a portion of, and/or be utilized with corrosion inhibition systems 8 according to the present disclosure. Coated substrates 30, corrosion inhibition coating materials 20, and corrosion inhibition compounds 10 are not limited to the specific embodiments illustrated and may incorporate any number of the various aspects, configurations, characteristics, properties, etc. that are discussed herein, as well as variations thereof, without requiring the inclusion of all such aspects, configurations, characteristics, properties, etc.

Corrosion inhibition compounds 10 include at least two corrosion inhibitor groups 12, which also may be referred to herein as inhibitor groups 12. Corrosion inhibitor groups 12 are linked via labile linkages 14 to the corrosion inhibitor compound 10 (as illustrated in more detail in FIG. 2). The labile linkages 14 are selected to separate, break, and/or cleave in response to a corrosion stimulus, resulting in the release of dissociated inhibitor groups 16 from corrosion inhibition compound 10 (as illustrated in more detail in FIG. 3). The release may be through dissociation of corrosion inhibitor group 12 from corrosion inhibition compound 10, liberation of corrosion inhibitor group 12 from corrosion inhibition compound 10, and/or decomposition of the corrosion inhibition compound 10 into one or more corrosion inhibitor groups 12.

Figure 2:
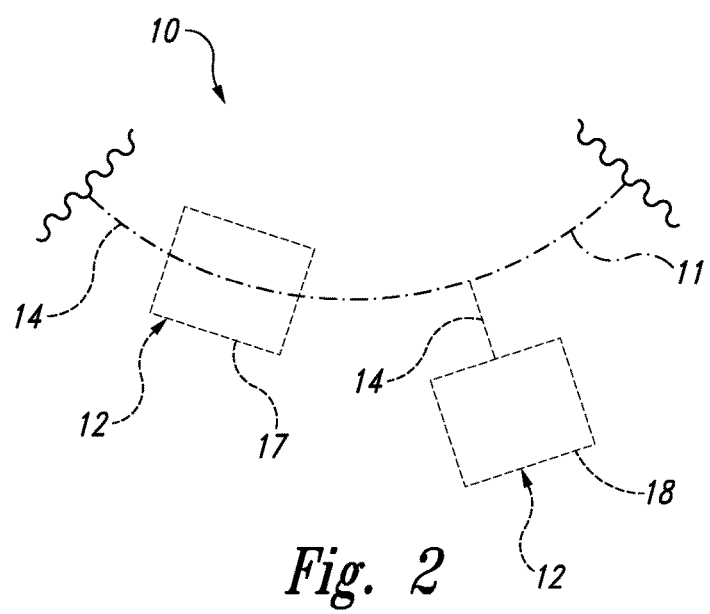
FIG. 2 is a schematic diagram of illustrative, non-exclusive examples of corrosion inhibition compounds according to the present disclosure.
Figure 3:
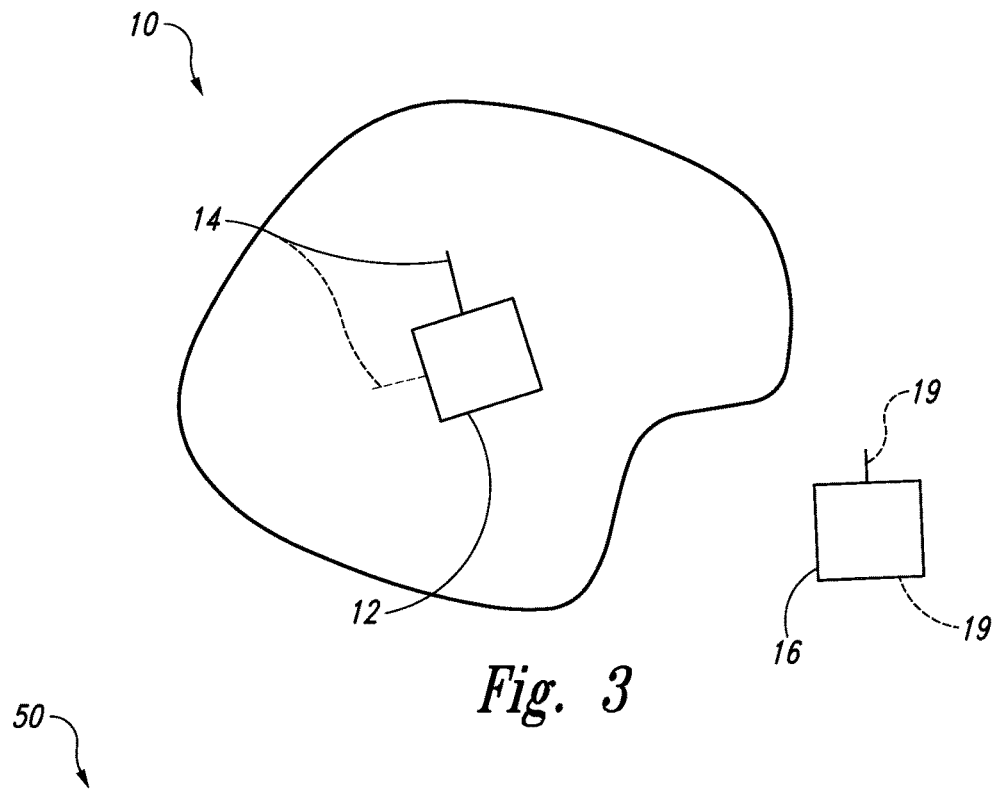
FIG. 3 is a schematic diagram of illustrative, non-exclusive examples of corrosion inhibition compounds with a dissociated inhibitor group according to the present disclosure.

FIG. 2 illustrates more detail of corrosion inhibition compound 10, including a portion of a backbone 11 of corrosion inhibition compound 10 and including two illustrative, non-exclusive locations for corrosion inhibitor groups 12, specifically a backbone inhibitor group 17 and a pendant inhibitor group 18. FIG. 3 illustrates more detail of a corrosion inhibition compound 10, including an inhibitor group 12 bound by at least one labile linkage 14. FIG. 3 additionally illustrates dissociated inhibitor group 16 that results from the release of inhibitor group 12 from the corrosion inhibition compound 10. Dissociated inhibitor group 16 may include one or more active groups 19.

Referring back to FIG. 1, corrosion inhibition compound 10 may be incorporated into and/or form a portion of corrosion inhibition coating material 20 that also includes a carrier 22. Corrosion inhibition coating material 20 may at least partially coat a substrate 31, forming coated substrate 30. Corrosion inhibition coating material 20 may be initially formed with inconsistencies 24 and/or may develop inconsistencies 24 over time. Inconsistencies 24, such as imperfections, pinholes, voids, scratches, and/or abrasions, may expose surface 34 of substrate 31 to an environment 38 that surrounds coated substrate 30. When environment 38 is conductive (for example when it includes electrolytes 40, e.g., ionic compounds such as salts), substrate 30 may form galvanic couples connecting anodic regions 32 and cathodic regions 33 through inconsistencies 24.

Substrate 31 may be formed from any suitable material and/or may include any suitable structure that may benefit from corrosion inhibition system 8 and/or that may be exposed to environment 38. As illustrative, non-exclusive examples, substrate 31 may include and/or be formed from a metal and/or a metal alloy. As additional illustrative, non-exclusive examples, substrate 31 may define one or more structural components of environmentally exposed apparatuses, such as aircraft, watercraft, spacecraft, land vehicles, equipment, and/or any apparatus susceptible to environmental degradation. Illustrative, non-exclusive examples of substrates 31 include aluminum, aluminum alloy, copper, copper alloy, iron, iron alloy, steel, steel alloy, titanium, titanium alloy, magnesium, and/or magnesium alloy.

Metals and metal alloys are subject to corrosion due to electrochemistry. Typically, metal alloys are used to improve the properties of the base metal. Some metal alloys reduce the likelihood for corrosion; however, some metal alloys introduce new mechanisms for corrosion. For example, alloys may be microscopically heterogeneous, exhibiting particles of metals atoms different from the bulk. As an illustrative, non-exclusive example, the 2000 series aluminum alloys may contain copper-magnesium rich intermetallic particles that are larger than 0.2 microns. Intermetallic particles may serve as cathodic regions 33 and/or anodic regions 32 that are galvanically coupled to the bulk metal of substrate 31. In aluminum, these intermetallic particles may catalyze the reduction of oxygen (the oxygen reduction reaction), driving peripheral corrosion of the bulk alloy and/or initiating stress corrosion cracking.

The corrosion stimulus may include and/or be any suitable event that may produce and/or be a precursor, or corrosion precursor event, for corrosion of substrate 31. As an illustrative, non-exclusive example, the corrosion stimulus may include and/or be a local potential from a galvanic couple (i.e., a local electric field). As additional illustrative, non-exclusive examples, the corrosion stimulus also may include a redox potential, a pH change, and/or a corrosion potential. A redox potential forms upon a particular chemical reaction. As examples, the redox potential of the reaction, $O_2(g)+4H^++4e^- \rightarrow 2H_2O$, is +1229 mV; and the redox potential of the reaction, $Cu(s) \rightarrow Cu^++e^-$, is −520 mV (both potentials relative to a standard hydrogen electrode). A corrosion potential of a material is the electrode potential of the material when undergoing corrosion. As examples, aluminum has a corrosion potential of about −500 mV, and steel has a corrosion potential of about −350 mV (both potentials are relative to a saturated calomel reference electrode). The sign of the potential indicates whether the substrate undergoes reduction (generally gain of electrons, with a positive potential) or oxidation (generally loss of electrons, with a negative potential). Corrosion inhibition systems 8 may be designed to inhibit reduction and/or oxidation, and therefore may respond to a positive and/or a negative local potential. With this in mind, a magnitude of the local potential of a corrosion stimulus may be greater than 50 mV, 100 mV, 200 mV, 300 mV, 400 mV, 500 mV, 600 mV, 700 mV, 800 mV, 900 mV or 1000 mV; and/or less than 1500 mV, 1200 mV, 1,000 mV, 900 mV, 800 mV, 700 mV, 600 mV, 500 mV, 400 mV, 300 mV, 200 mV, or 100 mV.

Substrates 31 may be protected from corrosion by applying corrosion inhibition coating materials 20 thereto to form coated substrates 30. As discussed, corrosion inhibition coating materials 20 comprise a corrosion inhibition compound 10 and a carrier 22 that is adapted to coat substrate 31. Carrier 22 may include and/or be any suitable material that is adapted and/or selected to coat substrate 31 and that also may be combined with corrosion inhibition compound 10. As illustrative, non-exclusive examples, carrier 22 may be selected to dissolve, suspend and/or disperse corrosion inhibition compound 10 therein. Corrosion inhibition coating materials 20 may be applied to substrate 31 and then cured on substrate 31, resulting in coated substrate 30 that includes a permanent, or semi-permanent, coating of cured corrosion inhibition coating material 26 on substrate 31. Substrate 31 optionally may be subject to a pretreatment before application of corrosion inhibition coating materials 20. Corrosion inhibition coating material 20 may be a liquid, a liquefiable composition, a powder, a gel, a sol-gel or a mastic composition at 20° C. Cured corrosion inhibition coating material 26 may be a solid composition or a mastic composition.

Corrosion inhibition coating material 20 may include and/or be any suitable material that may coat, cover, and/or encapsulate substrate 31. Illustrative, non-exclusive examples of corrosion inhibition coating materials 20 according to the present disclosure include chemical conversion coatings, pretreatments, paints, sealants, gel coatings, sol-gel coatings, thin films, resins, and/or epoxies. Illustrative, non-exclusive examples of carriers 22 include a polymer, a thermoset polymer, a thermoplastic polymer, an epoxy, a resin, a lacquer, a vinyl-acrylic polymer, a vinyl acetate/ethylene polymer, a polyurethane, a poly(vinylbutyral), a polyester, a gel, and/or a sol-gel coatings. It is within the scope of the present disclosure that carriers 22 further may include a pigment, a binder, a surfactant, an inorganic particle, an organic particle, a diluent, and/or a solvent, and other formulation additives as necessary.

Figure 4:
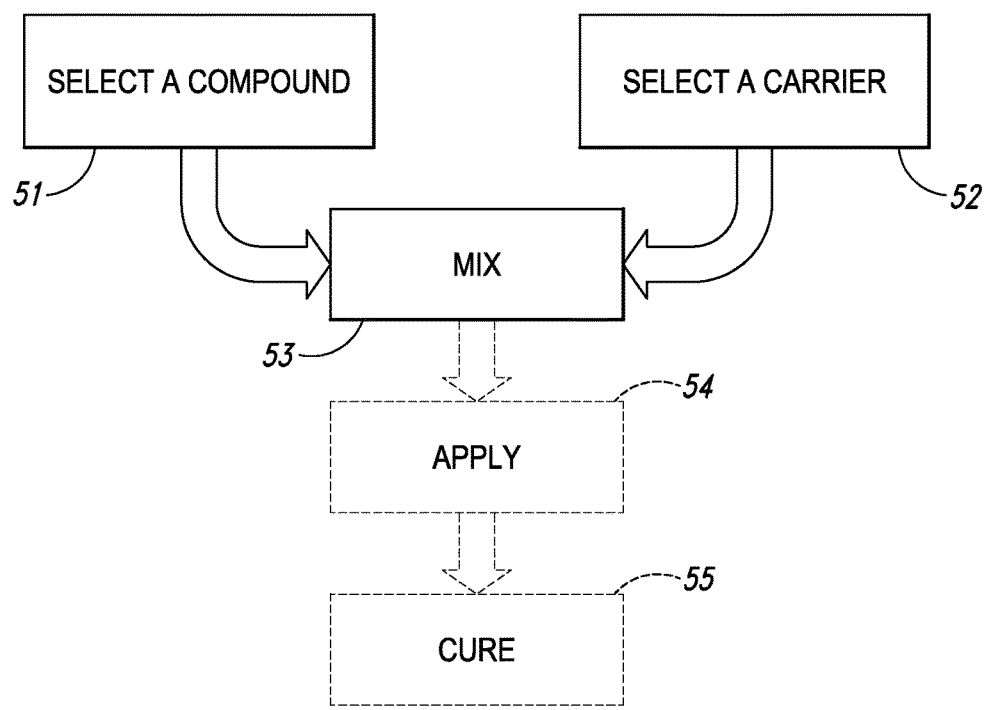
FIG. 4 is a flow chart illustrating methods of making corrosion inhibition systems according to the present disclosure.

As illustrated in FIG. 4, corrosion inhibition coating materials 20 may be created, formed, formulated, and/or synthesized using methods 50 by selecting a corrosion inhibition compound 10 at 51, selecting a carrier 22 at 52, and mixing corrosion inhibition compound 10 and carrier 22 at 53. Mixing 53 may include mixing a small enough amount of the corrosion inhibition compound to avoid substantially altering the properties of carrier 22. Typically, properties of carrier 22 are not substantially altered when the corrosion inhibition compound 10 is added at a final weight percent less than 10%, 5%, 2%, 1%, 0.5%, 0.2%, 0.1%, 0.05%, 0.02%, or 0.01%. Additionally or alternatively, the corrosion inhibition compound 10 may be added at a final weight percent greater than 0.001%, 0.01%, 0.02%, 0.05%, 0.1%, 0.2%, 0.5%, or 1%.

Generally, corrosion inhibition coating materials 20 have little or no hexavalent chromium. The hexavalent chromium content may be less than 10,000 ppm (parts per million), 1000 ppm, 100 ppm, 10 ppm, 1 ppm, 100 ppb (parts per billion), 10 ppb, or 1 ppb. Corrosion inhibition coating materials 20 may have no measureable hexavalent chromium and/or may be hexavalent chromium free.

Corrosion inhibition coating materials 20 optionally may be applied to a corrodible substrate 31 at 54. As illustrative, non-exclusive examples, corrosion inhibition coating materials 20 may be applied at by painting, spraying, electro-spraying, electro-coating, powder coating, fusion bonding, and/or immersing the substrate 31 with and/or within corrosion inhibition coating material 20. Where at least a portion of corrosion inhibition coating material 20 (such as corrosion inhibition compound 10) is produced by a microbe, the microbe may be applied to substrate 31. Thus, the microbe may form at least a portion of corrosion inhibition coating material 20 on substrate 31.

Corrosion inhibition coating material 20 optionally may be cured at 55, resulting in a cured corrosion inhibition coating material 26. Curing 55 may include solvent evaporation, application of heat, light, electrical potential, and/or a chemical reactant. Curing 55 may also include a chemical reaction, polymerization, cross-linking, and/or generally any method that results in a stable coating.

Returning to FIG. 1, cured corrosion inhibition coating materials 26, which also may be referred to herein as cured coatings 26, may be durable and/or may protect any underlying substrate 31. Cured coatings 26 may take the form of a layer, a conformal coating, a film, a membrane, and/or a biofilm. Cured coatings 26 may be cured onto substrate 31, chemically bonded to substrate 31, or otherwise adhered to substrate 31. Generally, a coated substrate 30 is less chemically reactive than substrate 31 alone. Additionally or alternatively, coated substrates 30 may be chemically resistant, abrasion resistant, germicidal, ice repellant, electrically conductive, and/or electrically non-conductive.

Corrosion inhibition coating materials 20 incorporate corrosion inhibition compounds 10 including corrosion inhibitor groups 12. Corrosion inhibition compounds 10 may define any suitable form, structure, and/or chemical structure. As an illustrative, non-exclusive example, corrosion inhibition compounds 10 may include and/or be polymeric materials and/or a polymer. A polymer is a molecule of high relative molecular mass, as discussed further herein, the structure of which essentially comprises multiple repeating units derived, actually or conceptually, from molecules of low relative molecular mass, as discussed further herein. The linkage of the repeating units to each other forms a backbone 11 (as shown in FIG. 2) of the polymer. If backbone 11 has no branches and does not connect to itself, the polymer may be referred to herein as a linear polymer. When backbone 11 essentially forms a closed loop, the polymer may be referred to herein as a cyclic polymer. When backbone 11 has branches, the polymer may be referred to herein as a branched polymer. Illustrative, non-exclusive examples of branched polymers include cross-linked polymers (essentially linear polymers linked to each other), dendritic polymers and/or comb polymers. Polymers may be homopolymers or copolymers. Homopolymers are polymers of one type of repeating unit, though the repeating units may each have different substitutions outside the polymer backbone. Copolymers include more than one type of repeating unit. Polymer properties typically do not depend on the addition or deletion of one repeating unit. However, some polymers have properties that may be dependent on fine details of the molecular structure. For example, a cyclic polymer may be transformed into a linear polymer by the breaking of a single bond.

As another illustrative, non-exclusive example, corrosion inhibition compounds 10 may include and/or be macrocycles, such as macrocyclic polysulfides, that include corrosion inhibitor groups 12, such as corrosion inhibitor groups 12 with active sulfide groups. A macrocycle is a cyclic molecule or a cyclic portion of a molecule with six or more core atoms in a ring configuration. The linkage of the core atoms, the ring of the macrocycle, is also called the backbone 11 of the macrocycle. Some macrocycles, including some macrocyclic polysulfides, are also cyclic polymers. Macrocycles, particularly macrocycles with nine or more core atoms, may be designed and/or selected for strong and specific affinity for surfaces of substrates, including surfaces of metals. Macrocyclic polysulfides include at least one disulfide bond or at least two metal-sulfide bonds along backbone 11 of the macrocycle. These bonds are labile, susceptible to cleavage by a corrosion stimulus, in particular a nearby or surrounding redox potential, and may form labile linkages 14. Thus, and upon a suitable corrosion stimulus, the disulfide bond may break, producing two active thiol groups. Alternatively, the metal-sulfide bond may break, producing one active thiol group.

Corrosion inhibition compounds 10 may be selected to be compatible with a carrier 22 that is used in a given corrosion inhibition coating material 20. For some coatings, carrier 22 is non-aqueous and/or hydrophobic. Use of water soluble materials in these coatings tends to result in partitioning of aqueous and non-aqueous components. Thus, where water solubility is a concern, corrosion inhibition compounds 10 may be selected to be hydrophobic or have an aqueous solubility less than 50 g/l, 20 g/l, 10 g/l, 5 g/l, 2 g/l, 1 g/l, 0.5 g/l, 0.2 g/l or 0.1 g/l. Alternatively or additionally, corrosion inhibition compounds 10 may be encapsulated, such as for example by being encapsulated in hydrotalcites and/or clays. Where water solubility is more desirable, corrosion inhibition compounds 10 may be selected to be hydrophilic or to include hydrophilic or charged groups such as quaternary amine groups.

Some carriers 22 used in corrosion inhibition coating materials 20 may be reactive, and may be specifically reactive with thiol groups, thione groups, amino groups and/or amido groups. However, corrosion inhibition compounds 10 may be selected to be substantially non-reactive with particular carriers 22. Chemical reactivity is a concept that describes the thermodynamic and kinetic factors that lead to chemical reactions, e.g., whether or not a species reacts and how fast it reacts. Non-reactive species are those that do not readily combine with other chemical species. Non-reactivity may be achieved by use of chemical protecting groups, e.g., chemical groups that modify functional groups such that subsequent reactions are inhibited. Chemical reactivity is typically characterized by the rate at which a chemical species tends to undergo chemical reaction. With this in mind, corrosion inhibition compounds 10 may be selected such that less than 90%, 80%, 50%, 20%, 10%, 1%, 0.1%, 0.01%, or 0.001% of the corrosion inhibition compound reacts, or is consumed, within a particular carrier 22 in a 24-hour period. Additionally or alternatively, the corrosion inhibition compounds 10 may be selected such that less than 90%, 80%, 50%, 20%, 10%, 1%, 0.1%, 0.01%, or 0.001% of labile linkages 14 of corrosion inhibition compound 10 react with a particular carrier 22 in a 24-hour period.

Corrosion inhibition compounds 10 may be selected to have an affinity for and/or to adhere to a selected surface of a substrate, such as to a surface 34 that may be defined by substrate 31. Corrosion inhibition compounds 10 may associate with surface 34 in a mono-dentate manner and/or a poly-dentate manner. Additionally or alternatively, corrosion inhibition compounds 10 may be selected to be substantially immobile, be substantially confined, and/or diffuse slowly in cured corrosion inhibition coating material 26. Thus, and upon occurrence of a corrosion stimulus that breaks a labile linkage 14 and/or releases a dissociated inhibitor group 16 from corrosion inhibition compound 10, dissociated inhibitor group 16 may be near and/or proximal to surface 34. This may permit dissociated inhibitor group 16 to quickly and/or efficiently inhibit the corrosion reaction, thereby protecting substrate 31 from corrosion. Additionally or alternatively, corrosion inhibition compounds 10 may be selected to be mobile and/or diffuse in uncured corrosion inhibition coating materials 20. Corrosion inhibition compounds 10 may selectively adhere and/or associate with surface 34 and thereby form a passive layer on surface 34 that may reduce or at least partially inhibit corrosion reactions at surface 34. Corrosion inhibition compounds 10 may have such a strong affinity for surface 34 that steric and/or entropic effects will limit the surface area available for corrosion initiation or propagation. Thus the affinity for surface 34 may effectively tune down corrosion reactions independent of any local corrosion stimulus and any disassociated corrosion inhibitor groups 16.

Additionally or alternatively, corrosion inhibition compounds 10 may be selected such that dissociated inhibitor groups 16 are mobile, e.g., diffuse quickly, in cured coating 26. This may permit dissociated inhibitor groups 16 to move quickly to any exposed surface 34 of substrate 31 (such as may be caused by the formation of an inconsistency 24 within cured coating 26).

Corrosion inhibition compounds 10 may be chemically synthesized or may be isolated from algae, fungi, or other plant, animal and/or microbial sources. This may include sources engineered to express, produce, and/or generate corrosion inhibition compounds 10 as part of their normal life cycle. A typical isolation scheme involves identification and collection of samples, extractions, solvent partitioning and size exclusion fractionation followed by structural elucidation.

Corrosion inhibition compounds 10 include at least two corrosion inhibitor groups 12 linked to corrosion inhibition compound 10 via labile linkages 14. Corrosion inhibition compound 10 may include a variety of corrosion inhibitor groups 12. Corrosion inhibitor groups 12 may be linked to corrosion inhibition compound 10 via a variety of labile linkages 14. Labile linkages 14 may be a chemical bond or other chemical association, and may be a direct or an indirect linkage. Labile linkages 14 may be selected to be sensitive to a corrosion stimulus, which results in the separation of labile linkage 14 and the release of dissociated inhibitor groups 16 (as illustrated in FIG. 3). In the absence of a corrosion stimulus, labile linkages 14 are generally non-reactive, e.g., they are chemically protected. Labile linkages 14 may be reversibly separated, allowing for reassociation of the dissociated inhibitor groups 16, or irreversibly separated. Suitable labile linkages 14 are chemical linkages susceptible to separation (including cleavage and breaking) by the corrosion stimulus, such as a redox stimulus and/or a redox potential. Illustrative, non-exclusive examples of labile linkages 14 include a sulfide bond, a disulfide bond, a polysulfide bond, and/or a metal-sulfide bond. More specific but still illustrative, non-exclusive examples of labile linkages 14 include S—S, S—C, S—Zn, S—Zr, S—Cu, S—Al, S—Fe, S—Cd, S—Pb, S—Hg, S—Ag, S—Pt, S—Pd, S—Au, S—Co and/or S—B bonds.

Labile linkage 14 may be sensitive to the corrosion stimulus if labile linkage 14 is selected to have a redox potential of magnitude not significantly greater than the corrosion potential of a substrate 31, not significantly greater than the redox potential of a corrosion reaction that may occur on and/or near substrate 31, and/or not significantly greater than the local potential at substrate 31. Suitable labile linkage 14 redox potentials include potentials of magnitude greater than 50 mV, 100 mV, 200 mV, 300 mV, 400 mV, 500 mV, 600 mV, 700 mV, 800 mV, 900 mV or 1000 mV; and/or less than 1500 mV, 1200 mV, 1000 mV, 900 mV, 800 mV, 700 mV, 600 mV, 500 mV, 400 mV, 300 mV, 200 mV, or 100 mV. Additionally or alternatively, the labile linkage 14 may be selected to separate at a fraction of the corrosion potential of a substrate 31, a fraction of the redox potential of the corrosion reaction, and/or a fraction of the local potential at substrate 31. Illustrative, non-exclusive examples of fractions include fractions of less than 100%, less than 90%, less than 80%, less than 70%, less than 60%, less than 50%, less than 40%, less than 30%, less than 20%, or less than 10%.

Labile linkage 14 may be sensitive to the corrosion stimulus if labile linkage 14 is selected to separate at a local acid pH and/or a local basic pH. For example, labile linkages 14 may be selected to separate at a local pH less than about 6, about 5, and/or about 4. Additionally or alternatively, labile linkages 14 may be selected to separate at a local pH greater than about 8, about 9, and/or about 10.

When labile linkages 14 separate, one or more dissociated inhibitor groups 16 are released from corrosion inhibition compound 10. A variety of dissociated inhibitor groups 16 may be released from corrosion inhibition compound 10, for example when corrosion inhibition compound 10 includes a variety of corrosion inhibition groups 12 and/or when corrosion inhibition groups 12 include a variety of labile linkages 14. Relative to corrosion inhibition compound 10, corrosion inhibitor groups 12 may be linked to form a part of backbone 11, as illustrated in FIG. 2 at 17. Backbone corrosion inhibitor groups 17 may be linked by one or more linkages to other backbone corrosion inhibitor groups 17. Backbone corrosion inhibitor groups 17 may be in the middle and/or at the end of backbone 11. When corrosion inhibitor groups 12 do not form a part of the backbone 11, they may be in a pendant arrangement, as illustrated in FIG. 2 at 18. While associated with corrosion inhibition compound 10, corrosion inhibitor groups 12 are generally non-reactive and/or non-reactive with corrosion inhibition coating material 20 prior to cure. For example, corrosion inhibitor groups 12 may be chemically protected, becoming unprotected in the presence of the corrosion stimulus. Additionally or alternatively, labile linkage 14, when broken by the corrosion stimulus, may become an active component of dissociated inhibitor group 16 (as illustrated in FIG. 3 by 19).

Dissociated inhibitor groups 16, released from the corrosion inhibition compound 10, are active, meaning the dissociated inhibitor groups 16 are selected to turn off or turn down the corrosion reaction, i.e., at least partially inhibit anodic reactions near anodic regions 32, cathodic reactions near cathodic regions 33, oxidation reactions, and/or reduction reactions, such as the reduction of oxygen (the oxygen reduction reaction). Dissociated inhibitor groups 16 may be electroactive and/or may include at least one active group 19 (as illustrated in FIG. 3). In particular, dissociated inhibitor groups 16 may be chosen to oxidize or reduce at a potential of lower magnitude than corrosion at surface 34 of substrate 31. Dissociated inhibitor groups 16 may also be chosen to form passivation layers and/or self-assembled monolayers at surface 34 of substrate 31. As illustrative, non-exclusive examples, dissociated inhibitor groups 16 may include active thiol groups, active thione groups, active amino groups and/or active amido groups that may form passivation layers and/or self-assembled monolayers on a metallic and/or metal alloy surface 34.

Active groups 19 may be linked to an organic moiety to form dissociated inhibitor groups 16. Dissociated inhibitor groups 16 may include an alkyl group, an aryl group, an alkyl-aryl group, an ether group, a carboxylic ester group, a phosphonate group, and/or a sulfonyl group. Additionally or alternatively, dissociated inhibitor group 16 may include a structure having 1-24 non-hydrogen atoms selected from C, N, P, O, S, Se, and Te; and optionally include a cyclic portion consisting of 3-24 core atoms. Illustrative, non-exclusive examples of dissociated inhibitor group 16 include an azole, a triazole, a thiazole, a dithiazole, a thiadiazole, an amino acid, a cysteine, a cystine, a tryptophan, a methionine, and/or a thiol-substituted N-containing aromatic compound.

Corrosion inhibitor groups 12 are necessarily smaller than corrosion inhibition compound 10. As illustrative, non-exclusive examples, corrosion inhibition compound 10 may include only a few corrosion inhibitor groups 12, such as 2, 3, 4, 5, 6, 7, or 8 corrosion inhibitor groups 12, and/or may essentially consist of only corrosion inhibitor groups 12. Corrosion inhibitor groups 12 may define any suitable molecular mass, including molecular masses of less than 1,000 Daltons, less than 500 Daltons, less than 200 Daltons or less than 100 Daltons; and/or molecular masses of greater than 50 Daltons, greater than 100 Daltons or greater than 200 Daltons. Similarly, corrosion inhibition compounds 10 also may define any suitable molecular mass that is greater than the molecular mass of two corrosion inhibitor groups 12. This may include molecular masses of greater than 200 Daltons, greater than 500 Daltons, greater than 1,000 Daltons, greater than 2,000 Daltons, greater than 5,000 Daltons or greater than 10,000 Daltons; and/or molecular masses of less than 100,000 Daltons, less than 10,000 Daltons, less than 5,000 Daltons, less than 2,000 Daltons, or less than 1,000 Daltons.

Systems, compositions, and methods for corrosion inhibition may be further understood with reference to the following illustrative, non-exclusive examples.

EXAMPLE 1

Macrocyclic Polysulfide Systems

Macrocyclic polysulfides, which are relatively uncommon in nature, exhibit a myriad of interesting biological activities including antifungal, anticancer, and/or antibacterial activity. Naturally occurring macrocyclic polysulfides have been mainly found in shitake mushrooms (*Lentinus edodes*), red algae (*Chondria californica*) and tropical mangrove (*Bruguiera gymnorrhiza*, family Rhizophoraceae). While corrosion inhibition properties of macrocyclic polysulfides have not been previously appreciated or used, these compounds are suitable corrosion inhibition compounds 10 for use in a corrosion inhibition system 8. Illustrative, non-exclusive examples of macrocyclic polysulfides are shown in Table 1. Compounds 1-9 may be extracted from *B. gymnorrhiza*. Compounds 10-13 may be extracted from *L. edodes*.

TABLE 1

| Compound | Name | Chemical structure |
|---|---|---|
| 1 | trans-1,2,6,7-tetrathiecane-4,9-diol | 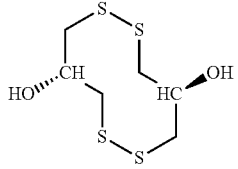 [SMILES: O[C@H]1CSSC[C@H](O)CSSC1] |
| 2 | cis-1,2,6,7-tetrathiecane-4,9-diol | 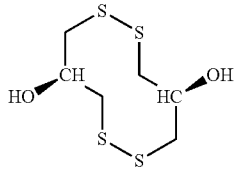 [SMILES: O[C@H]1CSSC[C@@H](O)CSSC1] |

TABLE 1-continued

| Compound | Name | Chemical structure |
|---|---|---|
| 3 | Gymnorrhizol (1,2,6,7,11,12-hexathiacyclopentadecane-4,9,14-triol) | |
| 4 | Neogymnorrhizol (1,2,6,7,11,12,16,17-octathiacycloicosane-4,9,14,19-tetrol) | |
| 5 | Bruguiesulfurol (X = O, Y = O) | |
| 6 | Brugierol (X = O, Y = lone pair) | |
| 7 | Isobrugierol (X = lone pair, Y = O) | |
| 8 | 1,2,6,7-tetrathiecane | |
| 9 | 1,2,6,7,11,12-hexathiacyclopentadecane | |
| 10 | Lenthionine (1,2,3,5,6-pentathiepane) | |
| 11 | 1,2,3,5,6,8-hexathionane | |

TABLE 1-continued

| Compound | Name | Chemical structure |
|---|---|---|
| 12 | 1,2,4,5-tetrathiane |  |
| 13 | 1,2,4,6-tetrathiepane |  |
| 14 | 1,4,7,10,13,16-hexathiacyclooctadecane | 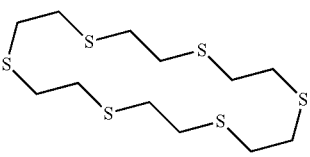 [SMILES: C1CSCCSCCSCCSCCSCCS1] |

As corrosion inhibition compounds 10, macrocyclic polysulfide compounds generally are responsive to a corrosion stimulus. When electrochemically or chemically reduced, macrocyclic polysulfide compounds produce thiol containing structures that may function as potent dissociated inhibitor groups 16, specifically inhibiting oxygen reduction. For example, gymnorrhizol (compound 3) is in equilibrium with dithiolan-4-ol, which in turn may be reduced to form the dithiol 1,3-bis(sulfanyl)propan-2-ol:

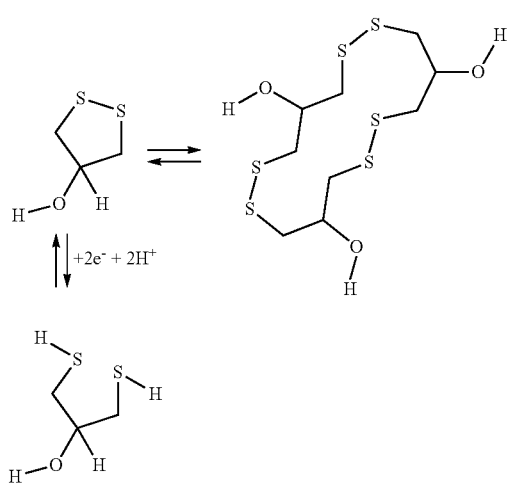 [SMILES: OC1CSSC1 ; OC1CSSCC(O)CSSCC(O)CSSC1 ; OC(CS)CS]

EXAMPLE 2

Amine Systems

Amino acids and/or other amino and amido group compounds, including quaternized amines, may be active corrosion inhibitors. However, they are typically highly soluble in aqueous media, and thus difficult to formulate into coating systems due to rapid dissolution from the coating as well as osmotic blistering issues. Solubility of amino acids may be reduced by esterification of the carboxyl groups. Amine group compounds may be configured as corrosion inhibitor groups 12 for substrates 31 by combining the amine compounds in a corrosion inhibition compound 10 that locks-in the amine-containing, corrosion inhibitor groups 12 and releases the active, dissociated inhibitor groups 16 on demand, i.e. when corrosion is actively occurring.

One type of active corrosion inhibition compound 10 includes disulfide and polydisulfide derivatives. An example of a naturally occurring disulfide is cystine. Upon electrochemical reduction, which occurs at cathodic sites on corroding substrates, cystine forms cysteine forming the basis of a corrosion inhibition system, following the reaction:

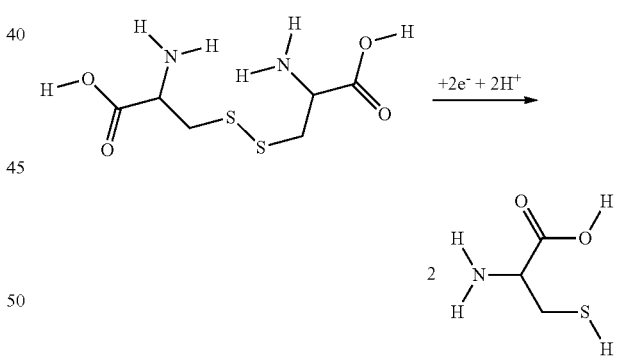

EXAMPLE 3

Polymer Systems

Illustrative, non-exclusive, examples of corrosion inhibitor groups 12 suitable as potentially incorporated into corrosion inhibition compounds 10 are listed in Table 2, wherein n is a positive integer and each R is independently H, aryl, alkyl, a corrosion inhibitor group 12, or a repeating unit.

TABLE 2

| Compound | Chemical name | Structure |
|---|---|---|
| 15 | 2,3-dimercapto 1,3,4-thiadiazole (DMcT) | |
| 16 | 1,2,4-thiadiazole-3,5-dithiol | |
| 17 | 1,2,4-thiadiazole-3,5-dithiol (bis-DMcT) | |
| 18 | propane-1,3-dithiol | |
| 19 | 2,3,5,6-tetrathiaheptane | |
| 20 | 1,3-bis(sulfanyl)propan-2-ol | |
| 21 | 2-sulfanylethanol | |
| 22 | 2-mercaptobenzimidazole | |

Illustrative, non-exclusive, examples of polymeric corrosion inhibition compounds 10 are listed in Table 3, wherein n is a positive integer; each R is independently H, aryl, alkyl, a corrosion inhibitor group 12, or a repeating unit; and each L is independently —S—$S_m$— or —S—X—$S_m$—, wherein m=0-8 and X is selected from the group consisting of a metal, Zn, Zr, Cu, Al, Fe, Cd, Pb, Hg, Ag, Pt, Pd, Au, Co, and B.

TABLE 3

| Compound | Name | Structure |
|---|---|---|
| 23 | Poly(DMcT) | |
| 24 | Cyclo-bis-DMcT | |
| 25 | | |
| 26 | Cyclo-poly-DMcT | |
| 27 | Poly(ZnDMcT) | |
| 28 | Poly(CuDMcT) | |
| 29 | Poly(FeDMcT) | |
| 30 | Poly(ZrDMcT) | |
| 31 | Poly(AlDMcT) | |

TABLE 3-continued

| Compound | Name | Structure |
|---|---|---|
| 32 | Poly(AlOH—DMcT) | |
| 33 | Zr(DMcT)$_4$ | |
| 34 | Zr(bis-DMcT)$_4$ | |
| 35 | Al(DMcT)$_3$ | |
| 36 | | |

TABLE 3-continued

| Compound | Name | Structure |
|---|---|---|
| 37 | | (structure) |
| 38 | | (structure) |

EXAMPLE 4

Synthesis of Metal Linked Polymers

Dimercaptothiadiazole (DMcT) and the dimer of DMcT (bis-DMcT) may be reacted under various conditions with different metal salts in order to produce complexes of these metal salts with the properties to inhibit corrosion of copper intermetallics in aluminum. DMcT is a cathodic inhibitor that is thought to inhibit corrosion by forming a strong bond with the copper-containing intermetallic sites on the surface of the aluminum, and thereby sequesters or prevents the oxidation reduction reaction in an electrolyte on a metallic surface. Zirconium, zinc, and copper salts may be reacted with both DMcT and bis-DMcT in order to produce corrosion inhibition compounds. The reactions of copper and zinc salts with DMcT and bis-DMcT produce good yields and visibly form a new product very quickly both in aqueous solutions and in methanol. The copper reactions occur quickly, forming an orange colored precipitate. The zinc reactions form a pale yellow precipitate and also occur quickly. The reactions of zirconium salts with DMcT and bis-DMcT in aqueous solutions and methanol appear to not undergo reaction at a rapid rate. In aqueous solutions, the materials mostly dissolve. Upon addition of zirconium, a pale yellow precipitate slowly forms. The yellow precipitates from these reactions are likely to be mostly unreacted DMcT and possibly low weight (less than 8 units max) polymers of DMcT. In the filtrates that produced a white precipitate, this precipitate is likely zirconium hydroxide.

EXAMPLE 5

Synthesis of bis-[2,5-dithio-1,3,4-thiadiazole] (BTDT)

Synthesis of BTDT follows the reaction:

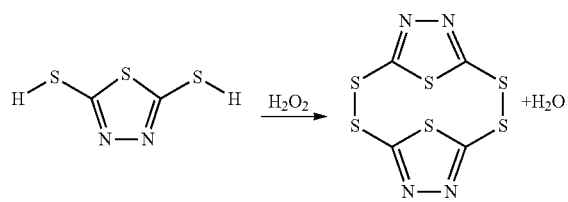

Suspend 15 grams of DMcT (0.1 mole), FW=150.22, in the form of a powder in 200 mL of water at 0° C. While vigorously stirring the suspension, 14 grams of 30% hydrogen peroxide solution (corresponding to 0.1 mole) add by drop (optionally using a peristaltic pump) at a slow rate such that the reaction temperature does not exceed 50° C. One-hour after the addition of the peroxide, filter off the BTDT, wash three times with deionized (DI) water and dry at 50° C. for 12 hours.

EXAMPLE 6

Synthesis of poly(2,5-dithio-1,3,4-thiadiazole) PDTD

Synthesis of PDTD follows the reaction:

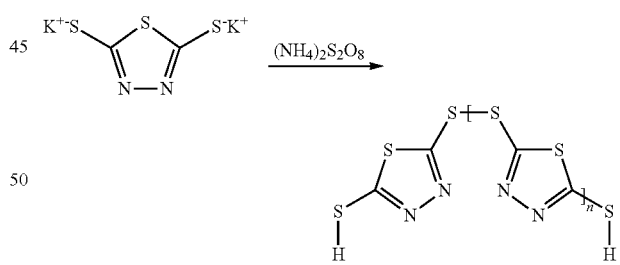

Dissolve 22 grams (0.1 mole) of dipotassium 1,3,4-thiadiazole-2,5-dithiolate KDMCT (0.1 mole) in 200 mL of water at 20° C. Dissolve 25.1 grams ammonium persulfate in 120 mL water. While vigorously stirring the KDMCT solution, add by drop the persulfate solution with a peristaltic pump over a period of 45 minutes. Stir the solution an additional hour (solids will form during this period). The resulting PDTD product should be washed 4× with 200 mL water. Transfer the solids to a Waring blender, disperse in 200 mL water and acidify with 0.1 M HCl to bring the pH to 2.0. Wash the product again with water (6×250 mL) and dry in a vacuum desiccator.

EXAMPLE 7

Synthesis of poly(ZnDMcT)

Synthesis of poly(ZnDMcT) follows the reaction:

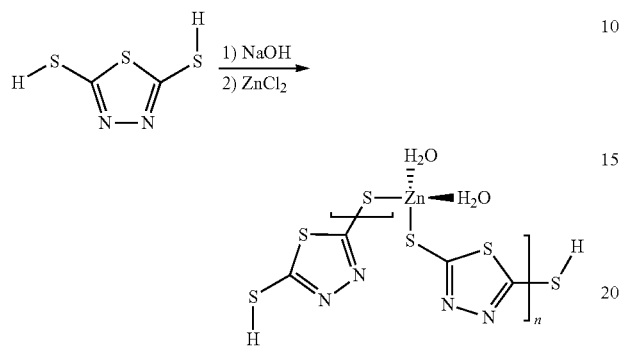

Disperse 15 grams of DMcT (0.1 mole) in 250 mL of water at 20° C. Slowly add 100 grams of 8% sodium hydroxide while stirring. A clear yellow solution will form. Dissolve 13.6 grams (0.1 mole) of zinc chloride (FW=136.28) in 100 mL water and slowly add to the yellow DMcT solution. Stir the resulting solution one hour at room temperature. A white precipitate will form. Wash the precipitate, poly(ZnDMCT), with distilled water. Vacuum dry for 16 hours at 80° C.

EXAMPLE 8

Synthesis of poly(CuDMcT)

Synthesis of poly(CuDMcT) follows the reaction:

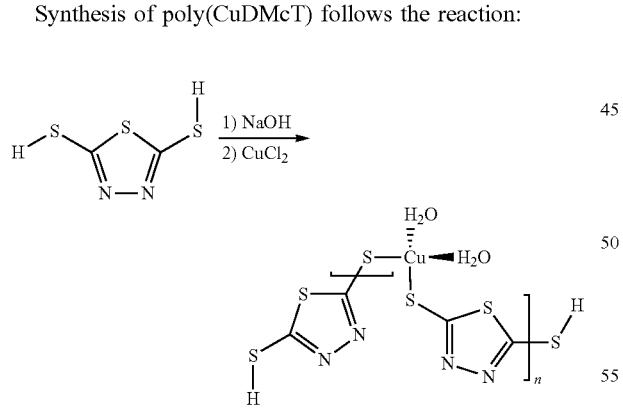

Disperse 15 grams (0.1 mole) of DMcT in 250 mL of water at 20° C. Slowly add 100 grams of 8% sodium hydroxide while stirring. A clear yellow solution will form. Dissolve 17.0 grams (0.1 mole) of copper (II) chloride dihydrate (FW=170.48) in 100 mL water and slowly add to the yellow DMcT solution. Stir the resulting solution for one hour at room temperature. A white precipitate will form. Wash the precipitate, poly(ZnDMCT), with distilled water. Vacuum dry for 16 hours at 80° C.

EXAMPLE 9

Synthesis of poly(AlDMcT)

Synthesis of poly(AlDMcT) follows the reaction:

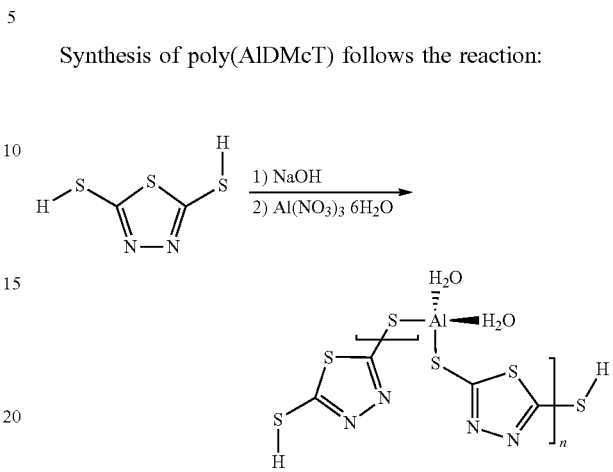

Disperse 15 grams (0.1 mole) of DMcT in 250 mL of water at 20° C. Slowly add 100 grams of 8% sodium hydroxide while stirring. A clear yellow solution will form. Dissolve 37.5 grams (0.1 mole) of aluminum nitrate hydrate (formula weight (FW)=375.13) in 100 mL water and slowly add to the yellow DMcT solution. Stir the resulting solution for one hour at room temperature. A solid precipitate will form. Wash 3× with DI water. Alternatively, the solution may be air dried to yield a powder.

EXAMPLE 10

Synthesis of poly(AlDMcT) 3:1

Synthesis of poly(AlDMcT) 3:1 follows the reaction:

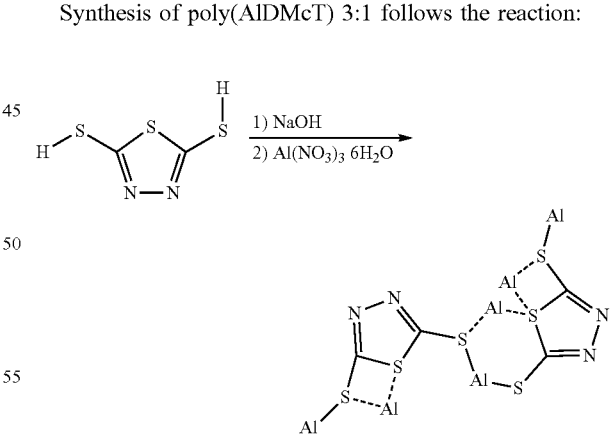

Disperse 15 grams (0.1 mole) of DMcT in 250 mL of water at 20° C. Slowly add 100 grams of 8% sodium hydroxide while stirring. A clear yellow solution will form. Dissolve 112.54 grams (0.3 mole) of aluminum nitrate hydrate (FW=375.13) in 100 mL water and slowly add to the yellow DMcT solution. Stir the resulting solution for one hour at room temperature. A solid precipitate will form. Wash 3× with DI water.

EXAMPLE 11

Synthesis of poly(FeDMcT)

Synthesis of poly(FeDMcT) follows the reaction:

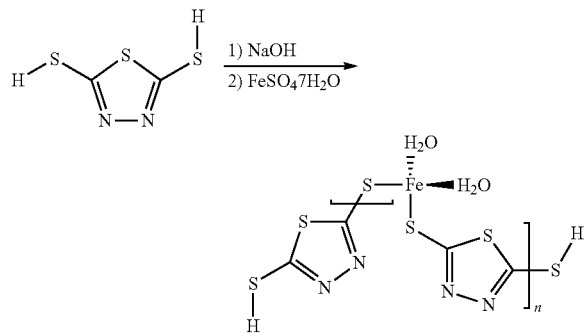

Disperse 15 grams (0.1 mole) of DMcT in 250 mL of water at 20° C. Slowly add 100 grams of 8% sodium hydroxide while stirring. A clear yellow solution will form. Dissolve 27.0 grams (0.1 mole) of ferrous sulfate heptahydrate (FW=278.02) in 100 mL water and slowly add to the yellow NaDMcT solution. Stir the resulting solution for one hour at room temperature. A very fine black precipitate will form. Wash the precipitate, poly(FeDMCT), 3× with 100 mL distilled water. Vacuum dry at 80° C.

EXAMPLE 12

Synthesis of Zr(DMcT)$_4$

Synthesis of Zr(DMcT)$_4$ follows the reaction:

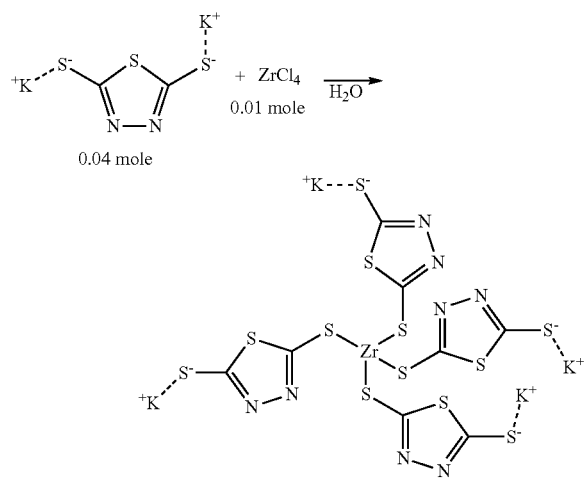

Dissolve 9.1 grams (0.04 mole) of K$_2$DMcT in 100 mL of water at 20° C. A clear yellow solution will form. Slowly add 2.4 grams (0.01 mole) of zirconium chloride to the stirred DMcT solution. A pale yellow slurry will result. Stir the slurry overnight at room temperature. Wash the precipitate, Zr(DMcT)$_4$, 3× with 100 mL with distilled water and dry at 100° C. Alternately, the filtrate, which is pale yellow in color, may be acidified to pH 1 with 20% sulfuric acid. A yellow precipitate will form. Stir this slurry overnight, filter and wash with DI water, then dry at 100° C. This procedure is equally effective with 0.04 mole of bis-DMcT substituted for the initial 0.04 mole of DMcT.

EXAMPLE 13

Alternate Methanol Synthesis of Zr(DMcT)$_4$

Dissolve 0.04 moles of DMcT in 100 mL of methanol at 20° C. Add 0.01 moles of solid zirconium salt dissolved in 100 mL methanol to the stirred DMcT solution. Reflux the solution overnight at 65° C. Distill the methanol off using a rotovap to recover the solids. Use a vacuum desiccator to dry.

EXAMPLE 14

Synthesis of Al(DMcT)$_3$

Synthesis of Al(DMcT)$_3$ follows the reaction:

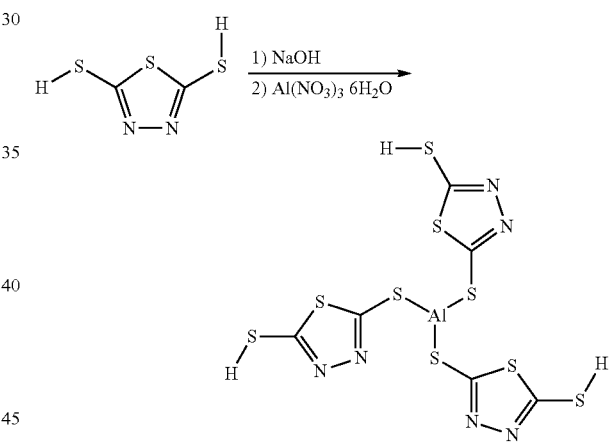

Dissolve 75 grams of DMcT (0.5 mole) in 1 liter of 1.0 N NaOH (1 mole). The dissolved DMcT yields a clear amber-yellow solution. Slowly add 62.5 grams (0.167 mole) of aluminum nitrate nonahydrate (FW=375.13) to the DMcT solution while stirring. A light yellow colored precipitate will form immediately. Slowly stir the resulting mixture, which has a DMcT to aluminum molar ratio of 3:1, for 4 hours. The pH of the slurry, measured using a glass electrode, should be about 5.44. Filter the slurry, using vacuum filtration, through Whatman 1001 125 qualitative filter paper. Wash 3× with 250 mL portions of DI water. Air dry to recover a yellow powder. The colorless filtrate should have a pH of about 5.49 (volume=1.25 liters). Add 50 mL of 3.8 M H$_2$SO$_4$ to the filtrate to bring the pH down to 1.26. During the addition of the acid, a cloudy precipitate will form. A slight "sulfur" odor may be detected. Vacuum filter this precipitate and wash 4× with 100 mL DI water. Air dry to obtain a light yellow product.

EXAMPLE 15

Synthesis of Doped Polyaniline (Doped-PANI)

Synthesis scheme for PANI doped with DMcT:

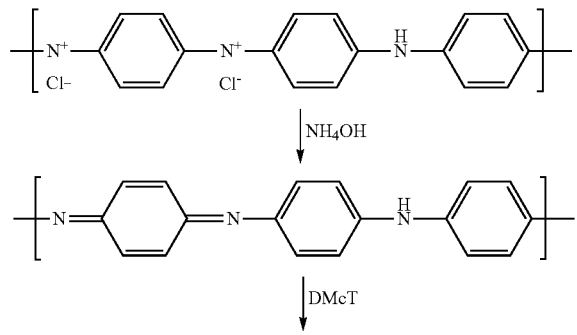

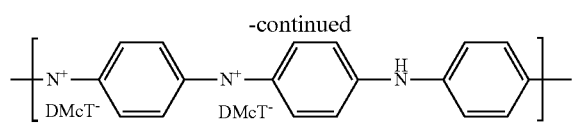
-continued

In a jacketed reaction vessel attached to a mixer and a chiller set at 0° C., add 0.2 moles aniline in DI water. Add 0.2 moles HCl to aniline. Dissolve 0.25 moles ammonium peroxydisulfate in DI water. Slowly add the peroxydisulfate to the aniline over 30 minutes using a peristaltic pump. Stir overnight to allow for polymerization to occur. Filter PANI-HCl using a nylon membrane (0.45 μm pore) and wash 3× with 0.2M HCl. Dedope the PANI by washing it with 0.1M ammonium hydroxide and filter. Dissolve DMcT in DI water to form a saturated solution. Disperse the PANI-Base in the DMcT solution and stir overnight. Filter PANI-DMcT as before and wash 3× with acetone. Air dry the PANI-DMcT and move to a vacuum desiccator overnight.

EXAMPLE 16

Direct Electrochemical Synthesis of PANI-DMcT on Anodized Aluminum

Electropolymerization of aniline to produce polyaniline is a known process. PANI has been touted as a corrosion protection system for ferrous metals through a passivation mechanism. On aluminum alloys, PANI has been shown to function as a barrier to corrosion in its basic or de-doped form. In its doped form utilizing traditional sulfonic acid dopants, corrosion protection has not been observed due to the continuous oxidation of the metal by the film resulting in delamination. Our approach is to dope the polyaniline with a corrosion inhibitor group such as DMcT (resulting in an inhibitor-doped PANI, PANI-INHIB). As the PANI-INHIB coated aluminum is exposed to the corrosive environment, the electrochemical potential swing to the negative direction will reduce the polyaniline, releasing the inhibitor. The released inhibitor shuts down the oxidation of the aluminum and the release process ceases.

Oxidation/reduction has a potential of 0.2-0.3 V (v. Ag/AgCl electrode) and follows the reaction:

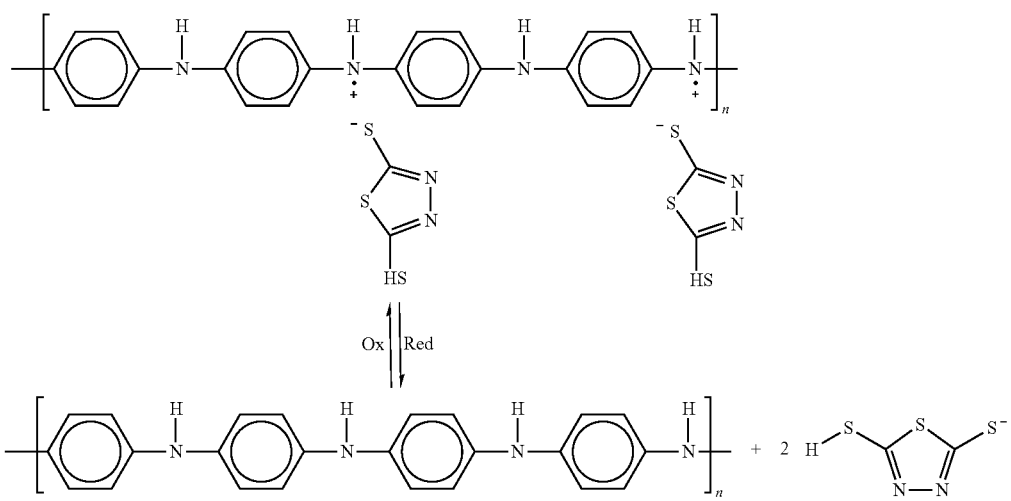

To verify functionality of PANI-INHIB, we prepared several aluminum panels and measured the coating resistance after salt fog exposure. Bare aluminum panels (3"× 6"×0.032" 2024-T3) were solvent wiped with MPK, alkaline cleaned, deoxidized and anodized at various time intervals at 19 volts in 10% sulfuric acid solution containing aniline at a concentration of 28.6 grams/liter. After the anodization process, the panels were rinsed in DI water and sealed at various time intervals in a saturated solution of DMcT (12.5 grams/liter) adjusted to pH 6 at a temperature of about 100° C. Control panels were anodized without aniline and sealed in either hot DI water or 5% potassium dichromate. Resistances were measured with a Keithly high resistance meter. Standard B117 salt fog was employed to verify corrosion resistance compared to controls.

Table 4 summarizes process parameters for anodization and seal steps. In each case utilizing the aniline/sulfuric acid batch, a green-blue teal coating was obtained. The coating turned blue (de-doped) when rinse with DI water, and turned green again (became doped) when sealed in DMcT. Panels 5 and 6 used no aniline during anodization. The seal step for panel 6 included water only.

TABLE 4

| Panel No. | Anodization Time (min) | Anodization Temp. (° F.) | Seal Time (min) | Seal Temp. (° F.) | Color | Initial Resistance, Ohms |
|---|---|---|---|---|---|---|
| 1 | 30 | 82 | 30 | 212 | Teal Green | Not meas. |
| 2 | 30 | 94 | 30 | 200 | Teal Green | 30-40 MΩ |
| 3 | 20 | 84-104 | 5 | 212 | Teal Green | Greater than 40 MΩ |
| 4 | 20 | 84-104 | 5 | 212 | Teal Green | Greater than 40 MΩ |
| 5 | 28 |  | 28 | 212 | Light Yellow | Not meas. |
| 6 | 28 |  | 28 | 212 | None | Not meas. |
| 7 |  | 76-84 | 20 | 212 | Yellow-green | 12 MΩ |

EXAMPLE 17

Binding Affinity and Cyclic Structures

Corrosion inhibition compounds 10 may exhibit specific affinity for surface 34 independent of any affinity of corrosion inhibitor groups 12 for surface 34. Specific affinities may be studied by molecular dynamics simulation of corrosion inhibitor candidate structures on surfaces. For example, molecular dynamics simulation of five DMcT molecules on a copper (100) surface indicates that the group of DMcT molecules begins to leave the copper surface after 5 femtoseconds. After 10 femtoseconds, the DMcT molecules are completely removed from the copper surface. When a cyclic polymer composed of five DMcT monomers (thus, a DMcT cyclic-pentamer) is placed on the same copper (100) surface, the cyclic molecule stays at the copper surface, regardless of simulation time. This increased affinity for copper and other metallic surfaces is indicative of the steric or entropic corrosion inhibition activity of these particular corrosion inhibition compounds. The compounds' affinity for metal surfaces effectively shrinks the exposed metal surface area that is available to act as a site for corrosion initiation and propagation.

EXAMPLE 18

Selecting Inhibitors

Corrosion inhibitor groups 12 may be selected for inhibition of oxidation or reduction reactions using electrochemical methods such as rotating disk voltammetry and/or cyclic voltammetry. The results of these methods are indicators of whether a candidate compound would be a suitable corrosion inhibitor group 12 and/or a suitable dissociated corrosion inhibitor group 16 that may be utilized in corrosion inhibition compounds 10 and/or corrosion inhibition systems 8.

Inhibitor efficiency may be used to select potential corrosion inhibitor groups. Inhibitor efficiency is given by the equation:

$$IE = 100\%\left(1 - \frac{i_I}{i_0}\right)$$

where $i_I$ is the current of the solution at equilibrium with inhibitor and $i_0$ is the current of the solution at equilibrium with no inhibitor. For example, several synthesized inhibitors were evaluated using a copper rotating disk voltammetry. Rotating disk voltammetry was performed in a 150-mL beaker filled with about 100 mL of solution containing a test compound, a copper rotating disk (at about 1000 RPM) as the working electrode, a platinum wire as the counter electrode, and a silver/silver chloride reference electrode. All inhibitors were dissolved in a 5% sodium chloride phosphate buffered saline (PBS) solution. Stock solutions were prepared at approximately 50 ppm and then filtered and weighed to determine their true concentration. 10 ppm solutions were then made using the stock solutions. All tests were performed at 10 ppm. The solutions were run using a chronoamperometry scan set at 800 mV for 30 minutes in order to allow for the system to reach steady state. All the materials tested showed an ability to inhibit the oxygen reduction reaction at the copper disk, as compared to the blank salt solution. The results are presented in Table 5. Of note, Zr(bis-DMcT) 1-1 ZrCl$_4$ shows an efficiency of nearly 60%, better than the inhibitor efficiency of DMcT (approximately 50%). Zr(bis-DMcT) 1-1 ZrCl$_4$ was synthesized using bis-DMcT and ZrCl$_4$ in aqueous media in a manner analogous to example 12 (adjusting the mole ratio to be 1:1).

TABLE 5

| Compound | Inhibitor efficiency |
|---|---|
| DMcT | 50.8% |
| Zr(bis-DMcT) 1-4 ZrOCl$_2$ | 30.2% |
| Zr(bis-DMcT) 1-4 Zr(SO$_4$)$_2$ | 40.6% |
| Zr(bis-DMcT) 1-1 ZrCl$_4$ | 58.9% |
| Zr(bis-DMcT) 1-2 ZrCl$_4$ | 37.1% |
| Zr(bis-DMcT) 1-4 ZrCl$_4$ | 36.5% |

Additionally or alternatively, potential corrosion inhibitor groups may be evaluated with linear sweep voltammetry (LSV). For example, LSV of various inhibitors in solution was performed using an EG&G Princeton Applied Research Model 636 rotating disk electrode rotator at 1000 RPM with a Series G-750 potentiostat, 750 microAmp version (PCI4G750-47062), with a platinum counter electrode and glass Calomel reference electrode. Gamry Framework software was used to measure LSV of various inhibitors in solution. A 99%+ pure copper disk (1 cm$^2$) working electrode, polished between readings, was used. Purity of the copper disk was verified using a Baird DV4 Arc/Spark optical emission spectrometer. LSV was measured at steady state which was reached by scanning repeatedly until the values stopped changing over time. The closer the current is to zero at steady state, the more efficient the test compound. For example, cysteine and cystine were tested at −600 mV, close to the corrosion potential of some metals. The two compounds were dissolved at 50 ppm in 5% NaCl PBS and compared to blank 5% NaCl PBS. Cysteine and cystine yielded −250 μA and −300 μA respectively, while the blank yielded −380 μA. Because the results indicate that both cysteine and cystine may inhibit corrosion, both cysteine and cystine are suitable corrosion inhibitor groups. An active thiol or access to an active thiol through reduction of a disulfide appears useful for inhibition of the oxygen reduction reaction on copper. The reduction potential of cysteine is about −0.5 V vs. Ag/AgCl, very close to the reduction potential of oxygen (about −0.5 V). Therefore, the reduction of cysteine to cystine should compete with the reduction of oxygen. When cysteine is reduced, the active thiol of cystine should form a Cu—S bond at the surface, inhibiting the oxygen reduction reaction.

Additionally or alternatively, potential corrosion inhibitor groups may be evaluated with chronoamperometry. Chronoamperometry may be performed by applying a −800 mV potential for 1800 seconds and monitoring the current as a function of time. The current at equilibrium is indicative of the ability of the inhibitor to inhibit the oxygen reduction reaction. The closer the current reads to zero at equilibrium, the more efficient the test compound. For example, cysteine, cystine, tryptophan, and methionine were tested with chronoamperometry. The four compounds were dissolved at about 50 ppm in 5% NaCl PBS and compared to blank 5% NaCl PBS. Table 6 shows the results after 1000 seconds, demonstrating that cystine, tryptophan, cysteine, and methionine are all suitable corrosion inhibitor groups.

TABLE 6

| Compound | Current |
| --- | --- |
| Cystine | −400 μA |
| Tryptophan | −480 μA |
| Cysteine | −480 μA |
| Methionine | −600 μA |
| Blank | −630 μA |

Additionally or alternatively, potential corrosion inhibitor groups may be evaluated with multielectrode electrochemical tests. For example, an analogue of a bio-derived inhibitor, 2-hydroxyethyl disulfide, was tested to demonstrate that even simple disulfide compounds may be effective corrosion inhibition compounds. Droplets of test solution were placed on an array of aluminum alloy (AA2024-T3) electrodes and current flow versus time was monitored. The test solutions were 0.1M NaCl (control) and 0.1M NaCl containing 0.001M 2-hydroxyethyl disulfide (sample). Lower currents indicate more efficient sample compounds. The average steady state current from the 2-hydroxyethyl disulfide solution was 2 μA, while the current from the control solution was 6 μA. The electrochemical reduction of 2-hydroxyethyl disulfide to yield 2-sulfanylethanol and its subsequent reaction with copper is

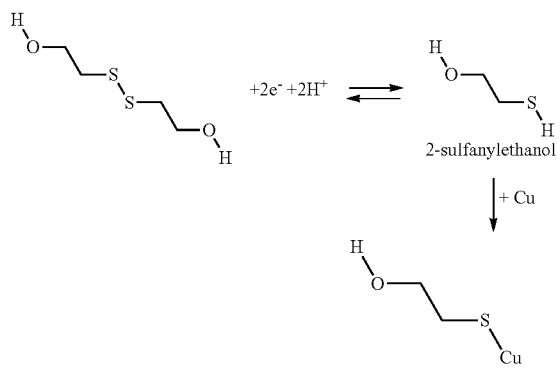

Here, the disulfide is expected to reduce at the cathodic intermetallic site of the aluminum alloy yielding the thiol that subsequently forms a covalent bond with the copper blocking the possibility of oxygen reduction.

Illustrative, non-exclusive examples of inventive subject matter according to the present disclosure are described in the following enumerated paragraphs:

A1. A corrosion inhibition compound comprising:
a backbone, and
at least two inhibitor groups, wherein the inhibitor groups are linked to the corrosion inhibition compound with a labile linkage, and
further wherein the labile linkage is selected to dissociate in response to a corrosion stimulus to produce a dissociated inhibitor group.

A2. The corrosion inhibition compound of paragraph A1, wherein the corrosion inhibition compound is a polymer.

A2.1. The corrosion inhibition compound of paragraph A2, wherein the polymer is a linear polymer, a macrocycle, a cyclic polymer, a branched polymer, or a cross-linked polymer.

A2.2. The corrosion inhibition compound of any of paragraphs A2-A2.1, wherein the polymer is a homopolymer or copolymer.

A3. The corrosion inhibition compound of any of paragraphs A1-A2.2, wherein the corrosion inhibition compound is a macrocyclic polysulfide.

A3.1. The corrosion inhibition compound of paragraph A3, wherein the macrocyclic polysulfide comprises 6-30 non-hydrogen core atoms, wherein at least two core atoms are S, and optionally wherein the core atoms are selected from the group consisting of C, S, N, P, O, Se, Te, Zn, Zr, Cu, Al, Fe, Cd, Pb, Hg, Ag, Pt, Pd, Au, Co, and B.

A4. The corrosion inhibition compound of any of paragraphs A1-A3.1, wherein the corrosion inhibition compound is hydrophobic.

A5. The corrosion inhibition compound of any of paragraphs A1-A4, wherein the corrosion inhibition compound includes an ester group.

A6. The corrosion inhibition compound of any of paragraphs A1-A5, wherein the corrosion inhibition compound includes a quaternary amine group.

A7. The corrosion inhibition compound of any of paragraphs A1-A6, wherein the corrosion stimulus includes a local electric field of magnitude exceeding about 50 mV, 100 mV, 200 mV, 300 mV, 400 mV, 500 mV, 600 mV, 700 mV, 800 mV, 900 mV or 1000 mV.

A8. The corrosion inhibition compound of any of paragraphs A1-A7, wherein the corrosion stimulus includes a local electric field of magnitude less than about 1500 mV, 1200 mV, 1,000 mV, 900 mV, 800 mV, 700 mV, 600 mV, 500 mV, 400 mV, 300 mV, 200 mV, or 100 mV.

A9. The corrosion inhibition compound of any of paragraphs A1-A8, wherein the corrosion stimulus includes a redox potential of magnitude greater than about 50 mV, 100 mV, 200 mV, 300 mV, 400 mV, 500 mV, 600 mV, 700 mV, 800 mV, 900 mV or 1000 mV.

A10. The corrosion inhibition compound of any of paragraphs A1-A9, wherein the corrosion stimulus includes a redox potential of magnitude less than about 1500 mV, 1200 mV, 1000 mV, 900 mV, 800 mV, 700 mV, 600 mV, 500 mV, 400 mV, 300 mV, 200 mV, or 100 mV.

A11. The corrosion inhibition compound of any of paragraphs A1-A10, wherein the corrosion stimulus includes a corrosion potential of magnitude greater than about 50 mV, 100 mV, 200 mV, 300 mV, 400 mV, 500 mV, 600 mV, 700 mV, 800 mV, 900 mV or 1000 mV.

A12. The corrosion inhibition compound of any of paragraphs A1-A11, wherein the corrosion stimulus includes a corrosion potential of magnitude less than about 1500 mV, 1200 mV, 1000 mV, 900 mV, 800 mV, 700 mV, 600 mV, 500 mV, 400 mV, 300 mV, 200 mV, or 100 mV.

A13. The corrosion inhibition compound of any of paragraphs A1-A12, wherein the labile linkage is selected to have a redox potential of magnitude greater than about 50 mV, 100 mV, 200 mV, 300 mV, 400 mV, 500 mV, 600 mV, 700 mV, 800 mV, 900 mV or 1000 mV.

A14. The corrosion inhibition compound of any of paragraphs A1-A13, wherein the labile linkage is selected to have a redox potential of magnitude less than about 1500 mV, 1200 mV, 1000 mV, 900 mV, 800 mV, 700 mV, 600 mV, 500 mV, 400 mV, 300 mV, 200 mV, or 100 mV.

A15. The corrosion inhibition compound of any of paragraphs A1-A14, wherein the corrosion stimulus includes a local pH of less than about 6, about 5, or about 4.

A16. The corrosion inhibition compound of any of paragraphs A1-A15, wherein the corrosion stimulus includes a local pH of greater than about 8, about 9, or about 10.

A17. The corrosion inhibition compound of any of paragraphs A1-A16, wherein the labile linkage is selected to separate at a local pH of less than about 6, about 5, or about 4.

A18. The corrosion inhibition compound of any of paragraphs A1-A17, wherein the labile linkage is selected to separate at a local pH of greater than about 8, about 9, or about 10.

A19. The corrosion inhibition compound of any of paragraphs A1-A18, wherein at least one inhibitor group forms a portion of the backbone.

A20. The corrosion inhibition compound of any of paragraphs A1-A19, wherein at least one inhibitor group is bound directly to the backbone.

A21. The corrosion inhibition compound of any of paragraphs A1-A20, wherein at least one inhibitor group is bound indirectly to the backbone.

A22. The corrosion inhibition compound of any of paragraphs A1-A21 wherein the labile linkage includes one of a sulfide bond, a disulfide bond, and a polysulfide bond.

A23. The corrosion inhibition compound of any of paragraphs A1-A22, wherein the labile linkage includes a metal-sulfide bond.

A24. The corrosion inhibition compound of any of paragraphs A1-A23, wherein the labile linkage includes a sulfur bonded to at least one atom selected from the group consisting of Zn, Zr, Cu, Al, Fe, Cd, Pb, Hg, Ag, Pt, Pd, Au, Co, and B.

A25. The corrosion inhibition compound of any of paragraphs A1-A24, wherein the labile linkage is selected to reversibly dissociate in response to the corrosion stimulus.

A26. The corrosion inhibition compound of any of paragraphs A1-A25, wherein the dissociated inhibitor group includes at least one of a thiol group and a thione group.

A27. The corrosion inhibition compound of any of paragraphs A1-A26, wherein the dissociated inhibitor group includes two or more thiol groups linked by at least one of an alkyl group, an aryl group, an alkyl-aryl group, an ether group, a carboxylic ester group, a phosphonate group, and a sulfonyl group.

A28. The corrosion inhibition compound of any of paragraphs A1-A27, wherein the dissociated inhibitor group includes at least one of an amino group and an amido group.

A29. The corrosion inhibition compound of any of paragraphs A1-A28, wherein the dissociated inhibitor group includes a structure having a number of non-hydrogen atoms selected from the group consisting of C, N, P, O, S, Se, and Te; wherein the number of non-hydrogen atoms is at most 24, 20, 16, 12, or 10; and optionally including a cyclic structure of a number of core atoms, wherein the number of core atoms is at most 24, 20, 16, 12, 10, 9, 8, 7, 6, 5, 4 or 3.

A30. The corrosion inhibition compound of any of paragraphs A1-A29, wherein the dissociated inhibitor group includes at least one moiety, each moiety independently selected from the group consisting of an azole, a triazole, a thiazole, a dithiazole, and a thiadiazole.

A31. The corrosion inhibition compound of any of paragraphs A1-A30, wherein the dissociated inhibitor group includes at least one of an amino acid, a cysteine, a cystine, a tryptophan, and a methionine.

A32. The corrosion inhibition compound of any of paragraphs A1-A31, wherein the dissociated inhibitor group includes a thiol-substituted N-containing aromatic ring.

A33. The corrosion inhibition compound of any of paragraphs A1-A32, wherein each inhibitor group is the same.

A34. The corrosion inhibition compound of any of paragraphs A1-A33, wherein at least one inhibitor group is different from at least one other inhibitor group.

A35. The corrosion inhibition compound of any of paragraphs A1-A34, wherein the dissociated inhibitor group is selected to reassociate with the corrosion inhibition compound and optionally reform the corrosion inhibition compound.

A36. The corrosion inhibition compound of any of paragraphs A1-A35, wherein the dissociated inhibitor group is electroactive.

A37. The corrosion inhibition compound of any of paragraphs A1-A36, wherein the dissociated inhibitor group is selected to inhibit anodic reactions and/or cathodic reactions.

A38. The corrosion inhibition compound of any of paragraphs A1-A37, wherein the dissociated inhibitor group is selected to inhibit oxidation reactions and/or reduction reactions.

A39. The corrosion inhibition compound of any of paragraphs A1-A38, wherein the dissociated inhibitor group is selected to oxidize at a surface at a potential of lower magnitude than corrosion of the surface, wherein the surface is a metal surface or a metal alloy surface.

A40. The corrosion inhibition compound of any of paragraphs A1-A39, wherein the dissociated inhibitor group is selected to be reduced at a surface at a potential of lower magnitude than corrosion of the surface, wherein the surface is a metal surface or a metal alloy surface.

A41. The corrosion inhibition compound of any of paragraphs A1-A40, wherein the dissociated inhibitor group is selected to form on a surface at least one of a passivation layer and a self-assembled monolayer, wherein the surface is a metal surface or a metal alloy surface.

A42. The corrosion inhibition compound of any of paragraphs A1-A41, wherein the corrosion inhibition compound has an affinity for a surface, optionally wherein the surface is one of a metal surface and a metal alloy surface.

A43. The corrosion inhibition compound of any of paragraphs A1-A42, wherein the corrosion inhibition compound is selected to adhere to a surface, optionally wherein the surface is one of a metal surface and a metal alloy surface.

A44. The corrosion inhibition compound of any of paragraphs A39-A43, wherein the surface includes at least one of aluminum, aluminum alloy, copper, copper alloy, iron, iron alloy, steel, steel alloy, titanium, titanium alloy, magnesium, and magnesium alloy.

A45. The corrosion inhibition compound of any of paragraphs A1-A44, wherein the dissociated inhibitor has a molecular mass less than about 1,000 Daltons, 500 Daltons, 200 Daltons or 100 Daltons.

A46. The corrosion inhibition compound of any of paragraphs A1-A45, wherein the dissociated inhibitor has a molecular mass greater than about 50 Daltons, 100 Daltons or 200 Daltons.

A47. The corrosion inhibition compound of any of paragraphs A1-A46, wherein the corrosion inhibition compound has a molecular mass greater than about 200 Daltons, 500 Daltons, 1,000 Daltons, 2,000 Daltons, 5,000 Daltons or 10,000 Daltons.

A48. The corrosion inhibition compound of any of paragraphs A1-A47, wherein the corrosion inhibition compound has a molecular mass less than about 100,000 Daltons, 10,000 Daltons, 5,000 Daltons, 2,000 Daltons, or 1,000 Daltons.

A49. The corrosion inhibition compound of any of paragraphs A1-A48, wherein the corrosion inhibition compound has a molecular mass and the dissociated inhibitor group has a molecular mass, and wherein the ratio of the corrosion inhibition compound molecular mass to the dissociated inhibitor group molecular mass is at least 2, 3, 4, 5, or 6.

A50. The corrosion inhibition compound of any of paragraphs A1-A49, wherein the corrosion inhibition compound does not include hexavalent chromium.

A51. The corrosion inhibition compound of any of paragraphs A1-A50, wherein the dissociated inhibitor does not include hexavalent chromium.

A52. The corrosion inhibition compound of any of paragraphs A1-A51, wherein the corrosion inhibition compound is extracted from at least one of a plant, an animal, and a microbe.

A53. The corrosion inhibition compound of any of paragraphs A1-A52, wherein the corrosion inhibition compound is selected from the group consisting of compound 1, compound 2, compound 3, compound 4, compound 5, compound 6, compound 7, compound 8, compound 9, compound 10, compound 11, compound 12, compound 13, compound 14, compound 23, compound 24, compound 25, compound 26, compound 27, compound 28, compound 29, compound 30, compound 31, compound 32, compound 33, compound 34, compound 35, compound 36, compound 37, and compound 38.

A54. The corrosion inhibition compound of any of paragraphs A1-A53, wherein the corrosion inhibitor groups are independently selected from the group consisting of compound 15, compound 16, compound 17, compound 18, compound 19, compound 20, compound 21, and compound 22.

B1. A corrosion inhibition coating material comprising:
a corrosion inhibition compound of any of paragraphs A1-A54, and
a carrier adapted to coat a substrate.

B2. The corrosion inhibition coating material of paragraph B1, wherein the corrosion inhibition compound is less than about 10, 5, 2, 1, 0.5, 0.2, 0.1, 0.05, 0.02, or 0.01 weight percent of the corrosion inhibition coating material; and/or at least about 0.001, 0.01, 0.02, 0.05, 0.1, 0.2, 0.5, or 1 weight percent of the corrosion inhibition coating material.

B3. The corrosion inhibition coating material of any of paragraphs B1-B2, wherein the corrosion inhibition coating material is a liquid, a liquefiable composition, a powder, a gel, a sol-gel or a mastic composition at 20° C.; and optionally wherein the corrosion inhibition coating material, when cured, is a solid or a mastic composition.

B4. The corrosion inhibition coating material of any of paragraphs B1-B3, wherein the corrosion inhibition coating material is a conversion coating.

B5. The corrosion inhibition coating material of any of paragraphs B1-B4, wherein the corrosion inhibition coating material includes less than 10,000 ppm, 1000 ppm, 100 ppm, 10 ppm, 1 ppm, 100 ppb, 10 ppb, or 1 ppb hexavalent chromium.

B6. The corrosion inhibition coating material of any of paragraphs B1-B5, wherein the corrosion inhibition coating material does not include hexavalent chromium.

B7. The corrosion inhibition coating material of any of paragraphs B1-B6, wherein the carrier includes at least one of a polymer, a thermoset polymer, a thermoplastic polymer, an epoxy, a resin, a lacquer, a vinyl-acrylic polymer, a vinyl acetate/ethylene polymer, a polyurethane, a poly(vinylbutyral), and a polyester.

B8. The corrosion inhibition coating material of any of paragraphs B1-B7, wherein the carrier includes at least one of a pigment, a binder, a surfactant, an inorganic particle, an organic particle, a diluent, and a solvent.

B9. The corrosion inhibition coating material of any of paragraphs B1-B8, wherein the corrosion inhibition coating material is in at least one of a cured state and an uncured state.

B10. The corrosion inhibition coating material of any of paragraphs B1-B9, wherein the carrier is substantially non-reactive with at least one of the corrosion inhibition compound and the labile linkage.

B11. The corrosion inhibition coating material of any of paragraphs B1-B10, wherein less than about 90%, 80%, 50%, 20%, 10%, 1%, 0.1%, 0.01%, or 0.001% of the corrosion inhibition compound reacts with the carrier every 24 hours, and optionally wherein the corrosion inhibition coating material is at least partially in an uncured state.

B12. The corrosion inhibition coating material of any of paragraphs B1-B11, wherein less than about 90%, 80%, 50%, 20%, 10%, 1%, 0.1%, 0.01%, or 0.001% of the labile linkages react with the carrier every 24 hours, and optionally wherein the corrosion inhibition coating material is at least partially in an uncured state.

B13. The corrosion inhibition coating material of any of paragraphs B1-B12, wherein the carrier is reactive with at least one of thiol groups, thione groups, amino groups and amido groups.

B14. The corrosion inhibition coating material of any of paragraphs B1-B13, wherein the substrate includes at least one of metal and metal alloy, and optionally wherein the substrate is pretreated.

B15. The corrosion inhibition coating material of any of paragraphs B1-B14, wherein the substrate includes at least one of aluminum, aluminum alloy, copper, copper alloy, iron, iron alloy, steel, steel alloy, titanium, titanium alloy, magnesium, and magnesium alloy.

B16. The corrosion inhibition coating material of any of paragraphs B1-B15, wherein the substrate includes a portion of at least one of an aircraft, a watercraft, a spacecraft, a land vehicle, and equipment.

B17. The corrosion inhibition coating material of any of paragraphs B1-B16, wherein the dissociated inhibitor group is mobile when the corrosion inhibition coating material is cured.

B18. The corrosion inhibition coating material of any of paragraphs B1-B17, wherein the dissociated inhibitor group is selected to diffuse in the corrosion inhibition coating material when the corrosion inhibition coating material is cured.

B19. The corrosion inhibition coating material of any of paragraphs B1-B18, comprising more than one type of corrosion inhibition compound.

B20. The corrosion inhibition coating material of any of paragraphs B1-B19, wherein the corrosion inhibition compound is selected from the group consisting of compound 1, compound 2, compound 3, compound 4, compound 5, compound 6, compound 7, compound 8, compound 9, compound 10, compound 11, compound 12, compound 13, compound 14, compound 23, compound 24, compound 25, compound 26, compound 27, compound 28, compound 29, compound 30, compound 31, compound 32, compound 33, compound 34, compound 35, compound 36, compound 37, and compound 38.

B21. The corrosion inhibition coating material of any of paragraphs B1-B20, wherein the corrosion inhibitor groups are independently selected from the group consisting of compound 15, compound 16, compound 17, compound 18, compound 19, compound 20, compound 21, and compound 22.

C1. A method of making a corrosion inhibition coating material comprising:
selecting a corrosion inhibition compound of any of paragraphs A1-A54,
selecting a carrier adapted to coat a substrate, and
mixing the corrosion inhibition compound and the carrier.

C2. The method of paragraph C1, wherein at least a portion of the corrosion inhibition coating material is extracted from a microbe.

C3. The method of any of paragraphs C1-C2, wherein mixing includes mixing such that the corrosion inhibition coating material has a corrosion inhibition compound weight percent of less than about 10, 5, 2, 1, 0.5, 0.2, 0.1, 0.05, 0.02, or 0.01; and/or a corrosion inhibition compound weight percent of at least about 0.001, 0.01, 0.02, 0.05, 0.1, 0.2, 0.5, or 1.

C4. The method of any of paragraphs C1-C3, wherein the corrosion inhibition coating material is the corrosion inhibition coating material of any of paragraphs B1-B21.

D1. A coated substrate comprising:
a corrosion inhibition coating material of any of paragraphs B1-B21, and
a substrate, wherein the corrosion inhibition coating material is adhered to the substrate.

D2. The coated substrate of paragraph D1, wherein the substrate includes at least one of a metal and a metal alloy, and optionally wherein the substrate is pretreated.

D3. The coated substrate of any of paragraphs D1-D2, wherein the substrate includes at least one of aluminum, aluminum alloy, copper, copper alloy, iron, iron alloy, steel, steel alloy, titanium, titanium alloy, magnesium, and magnesium alloy.

D4. The coated substrate of any of paragraphs D1-D3, wherein the substrate includes a portion of an aircraft, a watercraft, a spacecraft, a land vehicle, equipment or any apparatus susceptible to environmental degradation.

D5. The coated substrate of any of paragraphs D1-D4, wherein the coated substrate is abrasion resistant, chemically resistant, germicidal and/or ice repellant.

D6. The coated substrate of any of paragraphs D1-D5, wherein the coated substrate is less chemically reactive than the substrate.

D7. The coated substrate of any of paragraphs D1-D6, wherein the corrosion inhibition coating material forms at least a portion of at least one of a layer, a coating, a conformal coating, a film, a membrane, and a biofilm.

D8. The coated substrate of any of paragraphs D1-D7, wherein the corrosion inhibition coating material is at least one of cured on the substrate, and bonded to the substrate.

D9. The coated substrate of any of paragraphs D1-D8, wherein the substrate has a corrosion potential magnitude, and wherein the labile linkage is selected to dissociate at a magnitude less than about 100%, about 90%, about 80%, about 70%, about 50%, about 40%, about 30%, about 20%, or about 10% of the corrosion potential magnitude.

E1. A method of making a coated substrate comprising:
selecting a corrosion inhibition coating material of any of paragraphs B1-B21,
selecting a substrate, and
applying the corrosion inhibition coating material to the substrate.

E2. The method of paragraph E1, wherein the applying step includes at least one of painting, spraying, electro-spraying, electro-coating, powder coating, fusion bonding, and immersing the substrate.

E3. The method of any of paragraphs E1-E2, wherein at least a portion of the corrosion inhibition coating material is produced by a microbe.

E4. The method of any of paragraphs E1-E3, wherein the applying step includes applying a microbe that produces at least a portion of the corrosion inhibition coating material.

E5. The method of any of paragraphs E1-E4, wherein the coated substrate is the coated substrate of any of paragraphs D1-D9.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of making a corrosion inhibition coating material comprising:
   selecting a corrosion inhibition compound that is a cyclic organic compound that includes at least two inhibitor groups and a cyclic backbone of six or more core atoms, wherein the inhibitor groups each are linked to one of the core atoms of the cyclic backbone with a labile linkage each independently selected from the group consisting of a disulfide bond and a metal-sulfide bond, wherein each labile linkage is selected to dissociate in response to a corrosion stimulus to produce a dissociated inhibitor group, wherein each inhibitor group is linked in the cyclic backbone via the labile linkage as a backbone inhibitor group;
   selecting a carrier adapted to coat a substrate, wherein the carrier includes at least one of a thermoset polymer, an epoxy, a resin, or a polyurethane; and
   mixing the corrosion inhibition compound and the carrier.

2. The method of claim 1, wherein the selecting a corrosion inhibition compound includes selecting a corrosion inhibition compound that is a polymer.

3. The method of claim 1, further comprising selecting the corrosion inhibition compound such that the labile linkage will dissociate at a corrosion potential of magnitude less than about 600 mV.

4. The method of claim 1, further comprising selecting the carrier to coat a substantially metallic substrate, and further comprising selecting the corrosion inhibition compound such that the dissociated inhibitor group will be reduced at the metallic substrate at a potential of lower magnitude than corrosion of the metallic substrate.

5. The method of claim 1, further comprising selecting the corrosion inhibition compound such that the dissociated inhibitor group includes at least one of a thiol or a thione.

6. The method of claim 1, further comprising selecting the corrosion inhibition compound such that the dissociated inhibitor group includes at least one of an amine or an amido.

7. The method of claim 1, further comprising selecting the corrosion inhibition compound to have a specific affinity for the substrate.

8. The method of claim 1, further comprising selecting the corrosion inhibition compound such that the dissociated inhibitor group includes at least one moiety, each moiety independently selected from the group consisting of an azole, a triazole, a thiazole, a dithiazole, and a thiadiazole.

9. The method of claim 1, further comprising selecting the corrosion inhibition compound such that the dissociated inhibitor group includes a thiol-substituted N-containing aromatic ring.

10. The method of claim 1, further comprising selecting the corrosion inhibition compound and selecting the carrier such that the corrosion inhibition coating material includes less than 10 ppm hexavalent chromium.

11. The method of claim 1, wherein mixing includes mixing such that the corrosion inhibition coating material has a corrosion inhibition compound weight percent of less than about 1%.

12. The method of claim 1, wherein selecting a corrosion inhibition compound includes selecting a corrosion inhibition compound that is extracted from at least one of a plant or a microbe.

13. A coated substrate comprising:
   a corrosion inhibition coating material formed by the method of claim 1; and
   a substrate;
   wherein the corrosion inhibition coating material is cured onto the substrate.

14. The coated substrate of claim 13, wherein the substrate is substantially composed of aluminum alloy.

15. The coated substrate of claim 13, wherein the corrosion inhibition compound adheres to the substrate.

16. The coated substrate of claim 13, wherein the dissociated inhibitor group is electroactive.

17. The coated substrate of claim 13, wherein the substrate has a corrosion potential, and wherein each labile linkage dissociates at a potential of lower magnitude than the corrosion potential of the substrate.

18. The coated substrate of claim 13, wherein the substrate has a corrosion potential, and wherein each dissociated inhibitor group reduces at a potential of lower magnitude than the corrosion potential of the substrate.

19. A method of making a corrosion inhibition coating material comprising:
   selecting a corrosion inhibition compound that is a cyclic organic compound that includes at least two inhibitor groups and a cyclic backbone of six or more core atoms, wherein the inhibitor groups each are linked to one of the core atoms of the cyclic backbone with a labile linkage each independently selected from the group consisting of a disulfide bond and a metal-sulfide bond, wherein each labile linkage is selected to dissociate in response to a corrosion stimulus to produce a dissociated inhibitor group, wherein each inhibitor group is linked in the cyclic backbone via the labile linkage as a backbone inhibitor group, and wherein the dissociated inhibitor group includes at least one moiety, each moiety independently selected from the group consisting of an azole, a triazole, a thiazole, a dithiazole, and a thiadiazole;
   selecting a carrier adapted to coat a substrate; and
   mixing the corrosion inhibition compound and the carrier.

20. The method of claim 19, further comprising selecting the carrier to be reactive with thiol groups and non-reactive with the corrosion inhibition compound.

21. The method of claim 19, further comprising selecting the corrosion inhibition compound such that the labile linkage will dissociate at a corrosion potential of magnitude less than about 600 mV.

22. The method of claim 19, further comprising selecting the carrier to coat a substantially metallic substrate, and further comprising selecting the corrosion inhibition compound such that the dissociated inhibitor group will be reduced at the metallic substrate at a potential of lower magnitude than corrosion of the metallic substrate.

23. The method of claim 19, wherein mixing includes mixing such that the corrosion inhibition coating material has a corrosion inhibition compound weight percent of less than about 1%.

* * * * *

UNITED STATES PATENT AND TRADEMARK OFFICE
CERTIFICATE OF CORRECTION

PATENT NO. : 9,771,483 B2
APPLICATION NO. : 13/866805
DATED : September 26, 2017
INVENTOR(S) : Patrick John Kinlen, Erik David Sapper and Eileen Olga Kutscha Page 1 of 1

It is certified that error appears in the above-identified patent and that said Letters Patent is hereby corrected as shown below:

On the Title Page

In Item (72) Inventors, and after "Erik David Sapper" please insert the following:
--; Eileen Olga Kutscha, Seattle, WA (US)--

Signed and Sealed this
Twenty-second Day of January, 2019

Andrei Iancu
*Director of the United States Patent and Trademark Office*